US012164238B2

(12) United States Patent
Takayama et al.

(10) Patent No.: US 12,164,238 B2
(45) Date of Patent: Dec. 10, 2024

(54) CONTROLLING VOLTAGE IN AN IMAGE FORMING APPARATUS INCLUDING A BRUSH THAT COMES INTO CONTACT WITH AN IMAGE BEARING MEMBER

(71) Applicant: CANON KABUSHIKI KAISHA, Tokyo (JP)

(72) Inventors: Toshihiko Takayama, Kanagawa (JP); Shuichi Tetsuno, Kanagawa (JP); Mikihiko Hamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/182,231

(22) Filed: Mar. 10, 2023

(65) Prior Publication Data

US 2023/0305421 A1 Sep. 28, 2023

(30) Foreign Application Priority Data

Mar. 22, 2022 (JP) ................................ 2022-045082

(51) Int. Cl.
*G03G 15/00* (2006.01)
*G03G 15/02* (2006.01)
*G03G 21/12* (2006.01)

(52) U.S. Cl.
CPC ..... *G03G 15/0216* (2013.01); *G03G 15/5037* (2013.01); *G03G 21/12* (2013.01); *G03G 2215/022* (2013.01); *G03G 2221/1621* (2013.01)

(58) Field of Classification Search
USPC .......................................................... 399/359
See application file for complete search history.

(56) References Cited

U.S. PATENT DOCUMENTS

2008/0193153 A1* 8/2008 Yoshikawa ........ G03G 15/0225 399/50

FOREIGN PATENT DOCUMENTS

| | | | | |
|---|---|---|---|---|
| JP | 05313431 A | * 11/1993 | ..... G03G 2221/0005 |
| JP | 2003271030 A | 9/2003 | |
| JP | 2005017448 A | 1/2005 | |
| JP | 2005189319 A | 7/2005 | |
| JP | 2006171247 A | 6/2006 | |

* cited by examiner

*Primary Examiner* — Quana Grainger
(74) *Attorney, Agent, or Firm* — Canon U.S.A., Inc. IP Division

(57) ABSTRACT

An image forming apparatus includes an image bearing member, a brush, and a controller. The controller controls so that, in a case where, in a state where a recording material trailing edge in a conveyance direction is sandwiched at a transfer portion, an area of the image bearing member in the conveyance direction where the recording material is sandwiched in a direction perpendicular to the conveyance direction is a first area, and an area of the image bearing member in the conveyance direction where the recording material is not sandwiched is a second area, a first potential difference formed between a surface potential formed on the second area and a brush voltage, which is based on first information, when the second area reaches the brush and a second potential difference formed between the second area surface potential and the brush voltage, which is based on second information, are different.

16 Claims, 14 Drawing Sheets

CONTROLLING VOLTAGE IN AN IMAGE FORMING APPARATUS INCLUDING A BRUSH THAT COMES INTO CONTACT WITH AN IMAGE BEARING MEMBER

BACKGROUND

Field

The present disclosure relates to an image forming apparatus, such as a laser printer, a copying machine, and a facsimile machine, that obtains a recorded image by transferring a toner image electrophotographically formed on an image bearing member to a recording material.

Description of the Related Art

An electrophotographic system has been known as an image recording system used in image forming apparatuses such as a printer and a copying machine. In the electrophotographic system, a toner image is formed by forming an electrostatic latent image on a photosensitive drum (hereinafter, may be referred to as a drum) with a laser beam using an electrophotographic process, and developing the electrostatic latent image with a charged color material (hereinafter, referred to as toner). The toner image is then transferred to a recording material and fixed for image formation. To reduce the size of an image forming apparatus, a cleaner-less system has recently been discussed. The cleaner-less system refers to a system for removing and collecting toner remaining on the surface of a drum after a transfer process by cleaning the toner at the same time with development using a developing unit, and reusing the collected toner.

With the foregoing cleaner-less system, the absence of a cleaning unit that usually is disposed on the photosensitive drum can cause an image defect since paper dust adheres to the photosensitive drum in the process of transfer to the recording material.

In view of this, Japanese Patent Application Laid-Open No. 2003-271030 discusses a configuration where a fixed brush is disposed downstream of a transfer portion and upstream of a charging portion in the direction of rotation of the photosensitive drum to collect paper dust adhering to the photosensitive drum in the transfer process.

However, the configuration discussed in Japanese Patent Application Laid-Open No. 2003-271030 has raised the following issue. In a state where the toner is new and not sufficiently charged by friction at the developing portion, a lot of fog toner can be developed on non-image portions of the drum as an initial characteristic of toner. A high proportion of such a fog toner has polarity opposite to normal polarity. As the number of printed sheets increases after the start of using new toner, and the charging of the toner stabilizes, the ratio of toner of normal polarity in the fog toner increases.

Since the cleaner-less system discussed in Japanese Patent Application Laid-Open No. 2003-271030 does not use a cleaner, some of the toner remaining on the drum surface after the transfer process accumulates on the brush. It has been found that the toner accumulated on the brush also changes in polarity with the foregoing change in the polarity of the fog toner at the initial stage where the use of the new toner is started.

As the polarity of the toner accumulated on the brush changes, the electrostatic sensitivity of toner discharge from the brush due to variations in the drum potential changes. As a result, an image defect can occur because of unintended transfer of toner from the brush to the drum.

SUMMARY

The present disclosure is directed to an image forming apparatus including a brush in contact with a photosensitive drum, where an image defect resulting from toner accumulated on the brush is prevented.

According to an aspect of the present disclosure, an image forming apparatus includes an image bearing member that is rotatable, a charging member configured to charge a surface of the image bearing member at a charging portion opposed to the surface of the image bearing member, a developing member configured to supply toner charged to normal polarity to the surface of the image bearing member, a transfer member configured to come into contact with the image bearing member to form a transfer portion, and sandwich and convey a recording material and transfer the toner supplied to the image bearing member to the recording material at the transfer portion, a transfer voltage application unit configured to apply a transfer voltage having polarity opposite to the normal polarity to the transfer member, a brush configured to come into contact with the surface of the image bearing member to form a brush portion downstream of the transfer portion and upstream of the charging portion in a direction of rotation of the image bearing member, a brush voltage application unit configured to apply a brush voltage of the normal polarity to the brush, a storage unit configured to store information about use of the toner, and a control unit configured to control the transfer voltage application unit and the brush voltage application unit, wherein, after the toner supplied to the surface of the image bearing member is transferred to the recording material at the transfer portion, the developing member is configured to collect toner remaining on the surface of the image bearing member, and wherein, in a case where, in a state where a leading edge of the recording material in a conveyance direction of the recording material or a trailing edge of the recording material in the conveyance direction is sandwiched at the transfer portion, an area of the image bearing member in the conveyance direction where the recording material is sandwiched in a direction perpendicular to the conveyance direction at the transfer portion is a first area, and an area of the image bearing member in the conveyance direction where the recording material is not sandwiched in the direction perpendicular to the conveyance direction at the transfer portion is a second area, the control unit is configured to perform control so that a first potential difference formed between a surface potential formed on the second area and the brush voltage, which is based on first information stored in the storage unit, in a case where the second area reaches the brush portion and a second potential difference formed between the surface potential formed on the second area and the brush voltage, which is based on second information stored in the storage unit and different from the first information, in the case where the second area reaches the brush portion are different.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings. Dimensions, materials, shapes, and relative arrangement of components described in the exemplary embodiments are subject to appropriate changes depending on the configurations and various conditions of apparatuses to which the exemplary embodiments are applied. In other words, the following exemplary embodiments are not intended to limit the scope of the present disclosure.

1. Image Forming Apparatus

Figure 1:
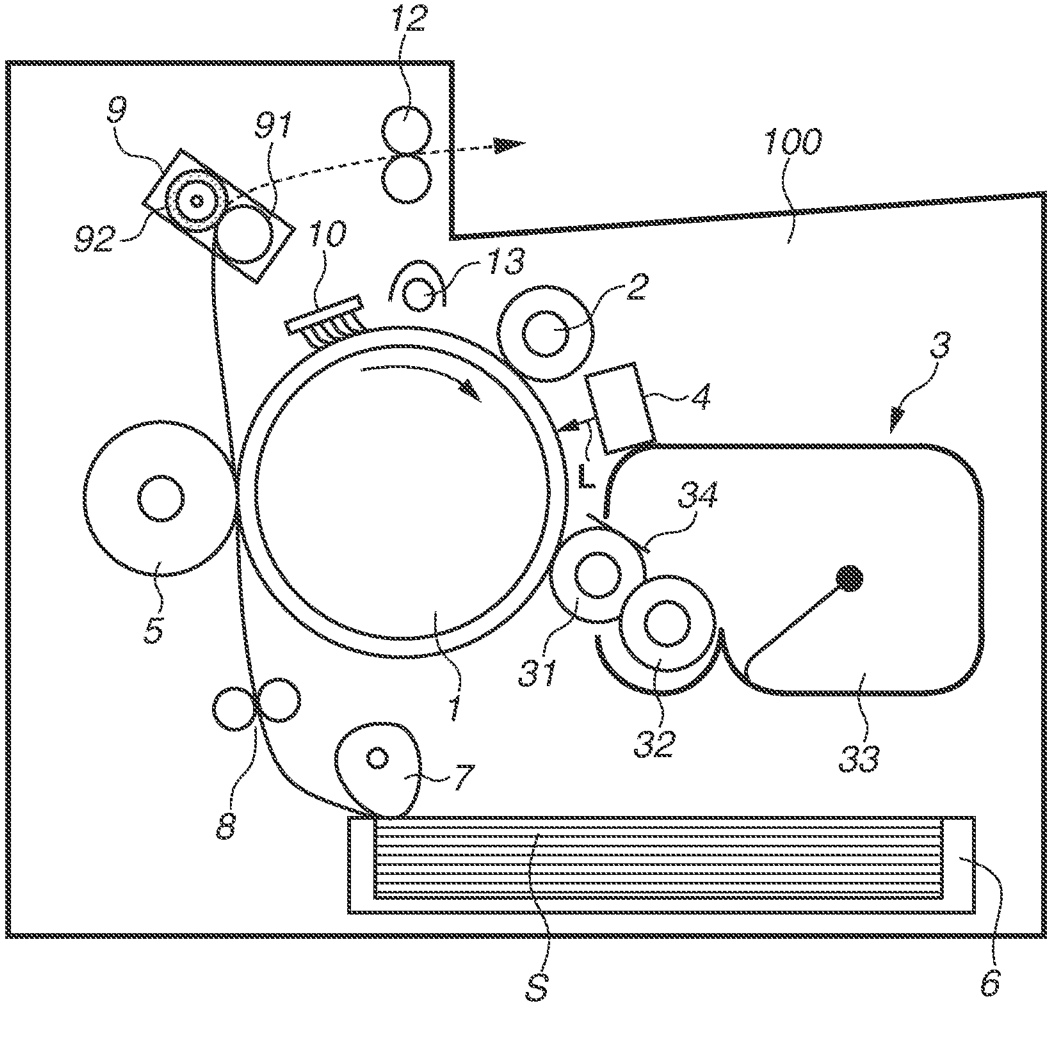
FIG. 1 is an explanatory diagram illustrating an image forming apparatus according to a first exemplary embodiment.

FIG. 1 illustrates a schematic configuration of an image forming apparatus 100 according to a first exemplary embodiment of the present disclosure.

The image forming apparatus 100 according to the present exemplary embodiment is a monochrome laser beam printer using a cleaner-less contact charging system.

The image forming apparatus 100 according to the present exemplary embodiment includes a cylindrical photosensitive member serving as an image bearing member, i.e., a photosensitive drum 1. A charging roller 2 serving as a charging unit and a developing device 3 serving as a developing unit are disposed near the photosensitive drum 1. In FIG. 1, an exposure device 4 serving as an exposure unit is located between the charging roller 2 and the developing device 3 in a direction of rotation of the photosensitive drum 1. A transfer roller 5 serving as a transfer unit is pressed against the photosensitive drum 1.

The photosensitive drum 1 according to the present exemplary embodiment is a negatively charged, organic photosensitive member. This photosensitive drum 1 includes a photosensitive layer on an aluminum drum-shaped base, and is driven to rotate at a predetermined process speed in the direction of the arrow in the diagram (clockwise) by a driving motor (driving unit) 110 (FIG. 2) serving as a driving unit. In the present exemplary embodiment, the process speed corresponds to the circumferential speed (surface movement speed) of the photosensitive drum 1, which is 140 mm/sec. The photosensitive drum 1 has an outer diameter of 24 mm.

The charging roller 2 that is a charging member is brought into contact with the photosensitive drum 1 with a predetermined pressure contact force, and driven to rotate on the photosensitive drum 1 while forming a charging portion. A charging voltage power supply 120 (FIG. 2) serving as a charging voltage application unit applies a desired charging voltage to the charging roller 2, whereby the surface of the photosensitive drum 1 is uniformly charged to a predetermined potential. In the present exemplary embodiment, the surface of the photosensitive drum 1 is charged to negative polarity by the charging roller 2. During the charging processing, the charging voltage power supply 120 serving as the charging voltage application unit applies the predetermined charging voltage to the charging roller 2. In the present exemplary embodiment, during the charging processing, a direct-current voltage of negative polarity is applied to the charging roller 2 as the charging voltage. The surface of the photosensitive drum 1 is thereby uniformly charged to a dark portion potential Vd. More specifically, the charging roller 2 charges the surface of the photosensitive drum 1 by using a discharge occurring in at least either one of small gaps formed between the charging roller 2 and the photosensitive drum 1 upstream and downstream of the contact portion with the photosensitive drum 1 in the direction of rotation of the photosensitive drum 1. In the following description, the contact portion between the charging roller 2 and the photosensitive drum 1 in the direction of rotation of the photosensitive drum 1 is assumed to be the charging portion.

In the present exemplary embodiment, the exposure device 4 serving as the exposure unit is a laser scanner device. The exposure device 4 outputs laser light corresponding to image information input from an external apparatus such as a host computer, and scans and exposes the surface of the photosensitive drum 1 with the laser light. This exposure forms an electrostatic latent image (electrostatic image) on the surface of the photosensitive drum 1 based on the image information. In the present exemplary embodiment, the exposure by the exposure device 4 reduces the dark portion potential Vd formed on the surface of the photosensitive drum 1 by the uniform charging processing into a light portion potential V1 in absolute value. Here, the position where the photosensitive drum 1 is exposed by the exposure device 4 in the direction of rotation of the photosensitive drum 1 is referred to as an exposure portion (exposure position). The exposure device 4 is not limited to a laser scanner device. For example, a light-emitting diode (LED) array including a plurality of LEDs arranged along the longitudinal direction of the photosensitive drum 1 may be used.

In the present exemplary embodiment, a contact developing system is used as the developing system. The developing device 3 includes a developing roller 31 serving as a developing member and a developer bearing member, a toner supply roller 32 serving as a developer supply unit, a developer accommodation chamber (developer container, developer accommodation unit) 33 accommodating toner, and a developing blade 34.

Toner supplied from the developer accommodation chamber 33 to the developing roller 31 by the toner supply roller 32 passes through a blade nip that is a contact portion between the developing roller 31 and the developing blade 34, and is thereby charged to a predetermined polarity. At a developing portion, the toner borne on the developing roller 31 moves from the developing roller 31 to the photosensitive drum 1 depending on the electrostatic image. Here, the developing portion refers to the contact portion between the developing roller 31 and the photosensitive drum 1 in the direction of rotation of the photosensitive drum 1. In the present exemplary embodiment, the developing roller 31 and the photosensitive drum 1 are constantly in contact with each other. In the present exemplary embodiment, the developing roller 31 is driven to rotate counterclockwise so that the photosensitive drum 1 and the developing roller 31 move in a forward direction at the developing portion. As in the present exemplary embodiment, the driving motor 110 serving as the driving unit to drive the developing roller 31 may be a main motor 110 common with the driving unit of the photosensitive drum 1. Alternatively, the photosensitive drum 1 and the developing roller 31 may be rotated by respective different driving motors such as a photosensitive drum driving unit and a developing roller driving unit. During development, a predetermined developing voltage is applied to the developing roller 31 by a developing voltage power supply 140 (FIG. 2) serving as a developing voltage application unit. A control unit 200 controls application of a direct-current voltage of =400 V to the core of the developing roller 31 from the developing voltage power supply 140 as a developing voltage Vdc during an image forming operation where the developing roller 31 and the photosensitive drum 1 are rotated in contact with each other. During image formation, electrostatic force caused by a potential difference between the developing voltage Vdc=−400 V and the image forming potential (light portion potential) V1=−100 V develops the toner borne on the developing roller 31 in the portions of the photosensitive drum 1 having the image forming potential V1.

In the following description, a potential or applied voltage of negative polarity having a large absolute value (for example, −1350 V with respect to −800 V) will be referred to as a high potential. A potential or applied voltage of negative polarity having a small absolute value (for example, −400 V with respect to −800 V) will be referred to as a low potential. The reason is that the toner with negative chargeability is assumed as a reference in the present exemplary embodiment.

In the present exemplary embodiment, voltages are expressed in terms of potential differences from a ground potential (0 V). The developing voltage Vdc=−400 V is thus interpreted as having a potential difference of −400 V from the ground potential because of the developing voltage applied to the core of the developing roller 31. The same applies to the charging voltage and the transfer voltage.

In the present exemplary embodiment, the toner charged with the same polarity as the charging polarity of the photosensitive drum 1 (in the present exemplary embodiment, negative polarity) adheres to exposed surfaces (image portions) that are image forming portions of the photosensitive drum 1 where the potential is reduced in absolute value by the exposure after the uniform charging processing. Such a developing system is referred to as a reversal developing system. In the present exemplary embodiment, the normal polarity that is the charging polarity of the toner during development is negative. While a one-component nonmagnetic contact development method is used in the present exemplary embodiment, the present disclosure is not limited thereto. A two-component nonmagnetic contact development method, a noncontact development method, or a magnetic development method may be used. The two-component nonmagnetic contact development method refers to a method in which a two-component developer including nonmagnetic toner and a magnetic carrier is used as the developer, and the developer (magnetic brush) borne on the developer bearing member is brought into contact with the photosensitive drum 1 for development. The noncontact development method refers to a method in which development is performed by causing toner to discharge from a developer bearing member opposed to a photosensitive member in a contactless manner to the photosensitive member. The magnetic development method refers to a method in which development is performed by magnetically bearing magnetic toner on a developer bearing member that includes a built-in magnet serving as a magnetic field generation unit and is opposed to a photosensitive member in a contact or contactless manner. In the present exemplary embodiment, toner having an average median particle diameter of 6 μm and a negative polarity as its normal charging polarity is used.

The transfer roller 5 serving as a transfer member suitably includes an elastic member made of sponge rubber such as polyurethane rubber, ethylene propylene diene monomer (EPDM) rubber, and nitrile butadiene rubber (NBR). The transfer roller 5 is pressed onto the photosensitive drum 1 to form a transfer portion where the photosensitive drum 1 and the transfer roller 5 are pressed against each other. During transfer, a transfer voltage power supply 160 (FIG. 2) serving as a transfer voltage application unit applies a predetermined transfer voltage to the transfer roller 5. In the present exemplary embodiment, a direct-current voltage of polarity (in the present exemplary embodiment, positive polarity) opposite to the normal polarity of the toner is applied to the transfer roller 5 as the transfer voltage during transfer.

The toner image is electrostatically transferred from the photosensitive drum 1 to a recording material (hereinafter, may be referred to as a sheet) S by the action of an electric field formed between the transfer roller 5 and the photosensitive drum 1.

A recording material S stored in a cassette 6 is fed by a feed unit 7 in synchronization with the timing when the toner image formed on the photosensitive drum 1 reaches the transfer portion. The recording material S is passed between a registration roller pair 8 and conveyed to the transfer portion. The toner image formed on the photosensitive drum 1 is transferred to the recording material S by the transfer roller 5 to which the predetermined transfer voltage is applied by the transfer voltage power supply 160 serving as the transfer voltage application unit.

After the transfer of the toner image, the recording material S is conveyed to a fixing device 9. The fixing device 9 is a film-heating fixing device including a not-illustrated fixing heater, a fixing film 91 including a not-illustrated built-in thermistor for measuring the temperature of the fixing heater, and a pressure roller 92 to be pressed against the fixing film 91. The recording material S is heated and pressed to fix the toner image, and is discharged outside the image forming apparatus 100 through a discharge roller pair 12.

In the present exemplary embodiment, a brush 10 (brush member) serving as a paper dust removal member is disposed in contact with the photosensitive drum 1 downstream of the transfer portion. The brush 10 removes paper dust transferred to the photosensitive drum 1 when the recording material S passes the transfer portion, from the photosensitive drum 1.

In the present exemplary embodiment, a pre-exposure device 13 serving as a pre-charging exposure unit is disposed to uniformize the potential of the photosensitive drum 1 after transfer downstream of the contact portion between the photosensitive drum 1 and the brush 10 and upstream of the charging portion in the direction of rotation of photosensitive drum 1. In the present exemplary embodiment, a not-illustrated LED disposed on a side surface of the main body is operated as the pre-exposure device 13, so that the photosensitive drum 1 is irradiated in a direction parallel to the main scanning direction of the photosensitive drum 1. A light guide serving as a light guide member for reducing irradiation nonuniformity in the main scanning direction may also be used.

Transfer residual toner remaining on the photosensitive drum 1 without being transferred to the recording material S passes the contact portion with the brush 10. After the potential of the photosensitive drum 1 is uniformized by the pre-exposure device 13, the charging roller 2 charges the transfer residual toner with the negative polarity again by using a discharge at the charging portion. As the photosensitive drum 1 rotates, the transfer residual toner charged to the negative polarity again by the charging roller 2 reaches the developing portion. The transfer residual toner having reached the developing portion moves to the surface of the developing roller 31 and is collected into the developer container 33.

2. Control Unit

Figure 2:
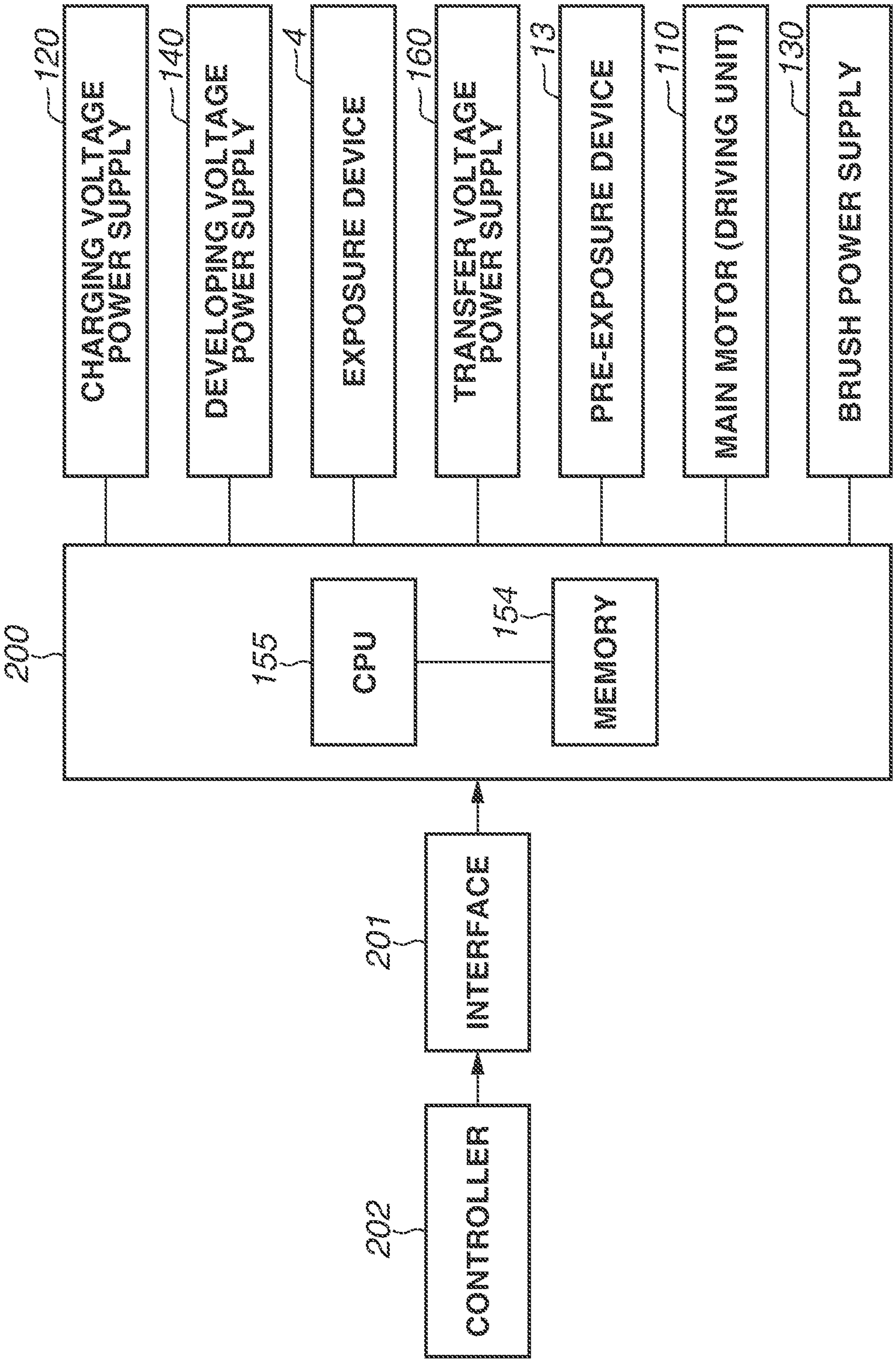
FIG. 2 is a schematic block diagram illustrating a mode of control of essential parts of the image forming apparatus according to the first exemplary embodiment.

Next, the control unit 200 will be described. FIG. 2 is a control block diagram illustrating a schematic mode of control of essential parts of the image forming apparatus 100 according to the present exemplary embodiment. A controller 202 transmits and receives various types of electrical information to/from a host apparatus, and controls an image forming operation of the image forming apparatus 100 in a centralized manner using the control unit 200 via an interface 201 based on predetermined control programs and reference tables. The control unit 200 includes a central processing unit (CPU) 155 that is the central element in performing various types of calculation processing, and a memory 154 serving as a storage unit including storage elements such as a read-only memory (ROM) and a random access memory (RAM). The memory 154 stores information about the use of toner, which is a feature of the present exemplary embodiment. The RAM stores detection results of sensors, counts of counters, and calculation results. The ROM stores control programs as well as data tables obtained by experiments in advance. Various control targets, sensors, and counters of the image forming apparatus 100 are connected to the control unit 200. The control unit 200 controls a predetermined image formation sequence by controlling the transmission and reception of various electrical information signals and the driving timing of various components.

For example, the control unit 200 controls the applied voltages and exposure amounts of the charging voltage power supply 120, the developing voltage power supply 140, the exposure device 4, the transfer voltage power supply 160, the pre-exposure device 13, and a brush power supply 130. The control unit 200 also control the main motor (driving unit) 110. The image forming apparatus 100 forms an image on a recording material S based on an electrical image signal input to the controller 202 from the host apparatus. Examples of the host apparatus include an image reader, a personal computer, a facsimile, and a smartphone. The image forming operation and other control according to the present exemplary embodiment will be described below.

3. Brush Configuration

The image forming apparatus 100 includes the brush 10 that comes into contact with the surface of the photosensitive drum 1 at a brush portion. In the first exemplary embodiment, the brush 10 collects paper dust adhering to the surface of the photosensitive drum 1. The brush 10 comes into contact with the surface of the photosensitive drum 1 to form a contact portion downstream of the transfer portion and upstream of the charging portion in the direction of rotation of the photosensitive drum 1.

Figure 3A:
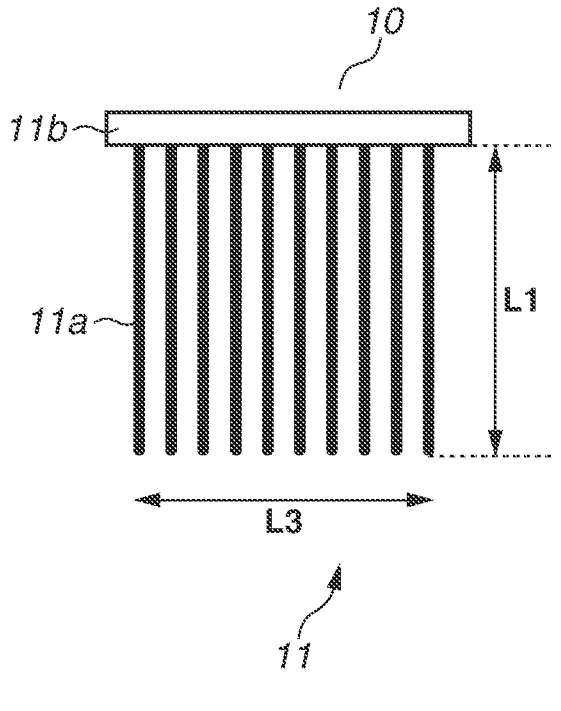
FIGS. 3A and 3B are sectional views of a brush according to the first exemplary embodiment.
Figure 3B:
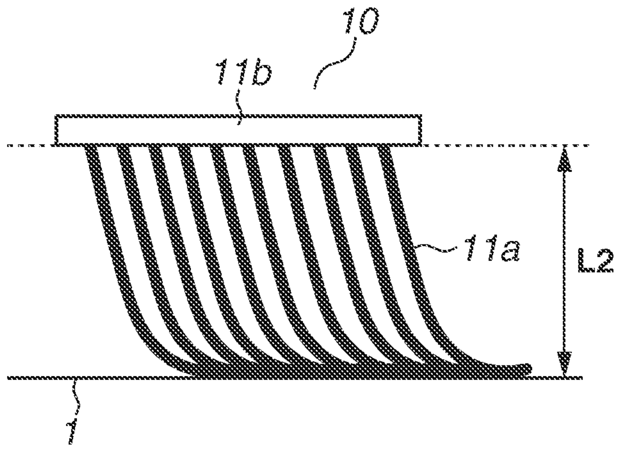

FIG. 3A is a diagram illustrating a cross section of the brush 10 in a standalone state (not in contact with the photosensitive drum 1), taken along an imaginary plane perpendicular to the rotation axis of the photosensitive drum 1. FIG. 3B is a diagram illustrating the foregoing cross section of the brush 10 in contact with the photosensitive drum 1.

As illustrated in FIGS. 3A and 3B, the brush 10 is a pile fabric including a thread portion 11 and a base fabric **11*b* supporting the thread portion 11. The thread portion 11 includes a plurality of conductive nylon threads 11*a* that is a plurality of bristle members to comes into contact with and slide on the surface of the photosensitive drum 1. The threads 11*a* extend from the base fabric 11*b* in a perpendicular direction when not in contact with the photosensitive drum 1. The threads 11*a* are uniformly arranged on the base fabric 11*b*. The brush 10 is located to come into contact with the photosensitive drum 1 downstream of the transfer portion and upstream of the charging portion in the direction of rotation of the photosensitive drum 1**.

The brush 10 is disposed with the longitudinal direction thereof parallel to the direction of the rotation axis of the photosensitive drum 1. Aside from nylon®, the threads **11*a* can be made of rayon, acrylic, and polyester materials. While conductive threads are used as the threads 11*a* in the first exemplary embodiment, insulating threads may be used. The threads 11*a*** may be any thread-like articles and not limited to ones formed by twisting fibers.

As illustrated in FIG. 3A, with the brush 10 in its standalone state, i.e., in a state where external bending force does not act on the threads **11*a* (natural state), the distance from the base fabric 11*b* to the ends of the threads 11*a* is L1. The brush 10 is fixed by fixing the base fabric 11*b* to a support member (not illustrated) located at a predetermined position of the image forming apparatus 100 with a fixing means such as a double-sided adhesive tape. The brush 10 is fixed so that a minimum distance L2 from the base fabric 11*b* of the brush 10 fixed to the support member to the surface of the photosensitive drum 1 is smaller than the length L1 of the threads 11*a* in the standalone state. The clearance between the support member and the photosensitive drum 1 is constant. The difference between L2 and L1 is referred to as the amount of inroad of the brush 10 with respect to the photosensitive drum 1. Since L2<L1, the ends of the threads 11***a* curve in the direction of rotation of the photosensitive drum 1 as illustrated in FIG. 3B when the brush 10 is in a use state, i.e., in a state where the brush 10 is fixed to the image forming apparatus 100 and in contact with the surface of the photosensitive drum 1. A contact portion between the end of the thread 11*a* located at the most upstream side among the threads 11*a* in the curved state and the surface of the photosensitive drum 1 is the upstream end of the contact area. A contact portion between the end of the thread 11*a* located at the most downstream side among the threads 11*a* in the curved state and the surface of the photosensitive drum 1 is the downstream end of the contact area. The contact between the brush 10 and the surface of the photosensitive drum 1 means a state in which each of the threads 11*a* is in contact with the surface of the photosensitive drum 1. The "contact area", microscopically, includes areas between the adjoining threads 11*a* where the surface of the photosensitive drum 1 and the brush 10 are not in contact with each other. The surface of the photosensitive drum 1 in the contact area and the brush 10 in contact with the surface of the photosensitive drum 1 form the contact portion.

The dimension of the brush 10 in the longitudinal direction (in the direction parallel to the rotation axis of the photosensitive drum 1) is set so that the brush 10 comes into contact with the entire image forming area (area where a toner image can be formed) of the photosensitive drum 1 in the direction of the rotation axis of the photosensitive drum 1. The dimension of the brush 10 in the transverse direction (in a direction parallel to the circumferential direction or the direction of rotation of the photosensitive drum 1) is set as appropriate based on the life of the image forming apparatus 100 or the process cartridge.

The brush 10 is fixed at a constant position with respect to the photosensitive drum 1, and slides on the surface of the photosensitive drum 1 as the photosensitive drum 1 moves (rotates). The brush 10 catches (collects) adhering substances such as paper dust transferred from the recording material S to the photosensitive drum 1 at the transfer portion, and thereby reduces the amount of paper dust moving to the charging portion and the developing portion downstream of the brush 10 in the moving direction (direction of rotation) of the photosensitive drum 1.

In the first exemplary embodiment, the length L1 of the threads 11*a* of the brush 10 in the natural state is 4.8 mm. The amount of inroad of the brush 10 with respect to the photosensitive drum 1 is 1.5 mm (L2=3.3 mm). The brush 10 has a transverse length L3 of 5 mm, and a longitudinal length of 230 mm. The threads 11*a* have a fineness (thickness) of 2 deniers (expressing the thickness of a thread of 9000 m weighing 2 g), and a density of 240 kF/inch$^2$ (kF/inch$^2$ is a unit of brush density, indicating the number of filaments per square inch). The threads 11*a* are almost uniformly arranged from the bottom of the base fabric 11*b* to the tips that are the contact portion with the surface of the photosensitive drum 1. The transverse length of the brush 10 is just an example and not limited to the foregoing. The greater the transverse length of the brush 10, the longer period the brush 10 can collect paper dust for. The longitudinal length of the brush 10 is just an example and not limited to the foregoing. For example, the longitudinal length of the brush 10 can be set based on the maximum sheet-passing width of the image forming apparatus 100. Moreover, the fineness of the threads 11*a* of the brush 10 is just an example and not limited to the foregoing. The fineness of the threads 11*a* can be determined in consideration of the passability of paper dust. The brush 10 with a too small fineness has low capability of holding paper dust, and paper dust is likely to pass through. Paper dust having passed through the brush 10 can interfere with the charging of the photosensitive drum 1 by the charging roller 2 and cause an image defect. On the other hand, if the threads 11*a* of the brush 10 have a too large fineness, toner and fine paper dust are unable to be collected. This can make the amount of adhering toner uneven in the longitudinal direction of the charging roller 2 and cause an image defect due to uneven image density and insufficient charging at areas where paper dust adheres. The density of the threads 11*a* of the brush 10 is just an example and not limited to the foregoing. The density of the threads 11*a* can be set in consideration of the toner passability and paper dust collectability. If the density of the threads 11*a* of the brush 10 is too high, the toner can get stuck due to low toner passability, and the stuck toner can scatter to stain the interior of the image forming apparatus 100. If the density of the threads 11*a* of the brush 10 is too low, sufficient paper dust collection performance cannot be provided. In view of the paper dust collection performance, the fineness and density of the threads 11*a* are desirably 1 to 6 deniers and 150 to 350 kF/inch$^2$, respectively. In view of long life, the transverse length L3 of the brush 10 is desirably 3 mm or more.

The brush power supply 130 serving as a brush voltage application unit is connected to the brush 10. During image formation, the brush power supply 130 applies a direct-current voltage of negative polarity to the brush 10 as a brush voltage.

4. Image Output Operation

The image forming apparatus 100 performs a series of operations to form an image on one or more recording materials S based on an instruction to start an image output operation (job) from an external apparatus (not illustrated) such as a personal computer. A job typically includes a pre-rotation step, an image formation step (printing step), a sheet interval step in the case of forming images on a plurality of recording materials S, and a post-rotation step. The image formation step includes forming an electrostatic image on the photosensitive drum 1, developing the electrostatic image (forming a toner image), transferring the toner image, and fixing the toner image. The period where the image forming step is performed is referred to as an image formation period. In the image formation period, i.e., in the period where the image formation step is performed, the operations such as the formation of the electrostatic image, the formation of the toner image, the transfer of the toner image, and the fixing of the toner image are performed at respective different timings. The pre-rotation step is a step of performing preparatory operations before the image formation step. The sheet interval step is a step performed between the image formation step on a first recording material S and the image formation step on a second recording material S subsequent to the first recording material S in continuously performing the image formation operations on a plurality of recording materials S (during continuous image formation). The post-rotation step is a step of performing rearranging operations (preparatory operations) after the image formation step. The periods other than the image formation period, i.e., the periods including the pre-rotation step, the sheet interval step, and the post-rotation step will be referred to as a non-image formation period. A preliminary rotation step of performing preparatory operations upon power-on of the image forming apparatus 100 or upon recovery from a sleep state is also included in the non-image formation period.

5. Mode of Control in Present Exemplary Embodiment

The control unit 200 is a control unit that controls operation of the image forming apparatus 100 in a centralized manner. The control unit 200 controls the transmission and reception of various electrical information signals and driving timing, and performs the predetermined image formation sequence. Various components of the image forming apparatus 100 are connected to the control unit 200. For example, as far as the present exemplary embodiment is concerned, the charging voltage power supply 120, the developing voltage power supply 140, the transfer voltage power supply 160, and the brush power supply 130 are connected to the control unit 200.

Next, to facilitate understanding of the issues to be described below and the control according to the present exemplary embodiment, basic control of various voltages, the surface potential formed on the photosensitive drum 1, and the transfer voltage will be described.

In the present exemplary embodiment, to uniformly charge the surface of the photosensitive drum 1, a charging voltage of −1350 V is applied to the charging roller 2. The photosensitive drum 1 is thereby charged to a non-image portion potential or dark portion potential Vd of −800 V. Next, the dark portion potential Vd formed by the uniform charging processing is reduced into an image portion potential or light portion potential V1 in absolute value by exposure by the exposure device 4. In the present exemplary embodiment, the light portion potential V1 is −100 V. Next, in the present exemplary embodiment, a developing voltage Vdc of −400 V is applied to the developing roller 31 to develop portions having the light portion potential V1. Moreover, in the present exemplary embodiment, a brush voltage of −400 V is applied to the brush 10.

Next, transfer control during a print operation will be described. If a print job is input, the photosensitive drum 1 and the developing roller 31 initially start to be driven to rotate, and the foregoing charging voltage and developing voltage are applied.

After the rotation speeds and the surface potential formed on the photosensitive drum 1 stabilize, the transfer voltage power supply 160 applies a voltage of positive polarity to the transfer roller 5. Here, the output voltage value from the transfer voltage power supply 160 is adjusted and sampled so that the value of the current flowing through the transfer roller 5 detected by a not-illustrated current detection circuit converges to a target current value. A resistance detection voltage value VO during non-sheet passing is thereby calculated. The control unit 200 then switches to constant voltage control in synchronization with timing when the leading edge of a recording material S (referred to as a recording material leading edge) enters the transfer portion in the conveyance direction of the recording material S. This constant voltage control includes applying a voltage (recording material leading edge voltage) the value of which is determined by calculation processing of multiplying the resistance detection voltage value V0 by a predetermined coefficient.

Then, when the recording material leading edge passes a certain distance from the transfer portion, the control unit 200 switches to constant current control. In the present exemplary embodiment, the target current value of the constant current control during sheet passing is 15 μA. In this constant current control interval, a resistance detection voltage value V1 during sheet passing is calculated. Next, the control unit 200 switches to constant voltage control a predetermined time before the trailing edge of the recording material S (referred to as a recording material trailing edge) enters the transfer portion in the conveyance direction of the recording material S. This control voltage control includes applying a voltage (recording material trailing edge voltage) the value of which is determined by multiplying the resistance detection voltage value V1 by a predetermined coefficient. At timing when the recording material trailing edge passes a predetermined distance from the transfer portion, the recording material trailing voltage is switched to a sheet interval voltage. In the case of a continuous sheet-passing job, the recording material leading edge voltage is applied again in synchronization with the subsequent recording material leading edge, and the foregoing control is repeated. After the transfer operation of the last image of the job is ended by such operations, the post-rotation operation is performed and stopped.

In the present exemplary embodiment, a sheet-to-sheet distance is 70 mm, which is shorter than the circumferential length of the photosensitive drum 1.

6. Mechanism for Discharging Toner from Brush

Next, to facilitate understanding of the control according to the present exemplary embodiment, a toner transfer operation from the brush 10 to the surface of the photosensitive drum 1, or a mechanism for discharging toner from the brush 10, will be described.

Initially, toner accumulation on the brush 10 will be described. There are two types of toner accumulated on the brush 10. One is fog toner, and the other is transfer residual toner. The fog toner is a part of toner coating the developing roller 31 that is transferred to non-image potential portions (portions having the dark portion potential Vd) formed on the surface of the photosensitive drum 1. The transfer residual toner is toner remaining on the surface of the photosensitive drum 1 after the developed toner in image potential portions (portions having the light portion potential V1) is transferred to a recording material S at the transfer portion. The two types of toner vary in the amount collected by the brush 10 and in a polarity ratio depending on the following factors: an electrostatic factor due to a potential difference between the surface potential formed on the photosensitive drum 1 and the brush voltage, and a physical factor due to being held at the gaps between the threads 11*a* and by the contact pressure of the threads 11*a*.

Figure 4:
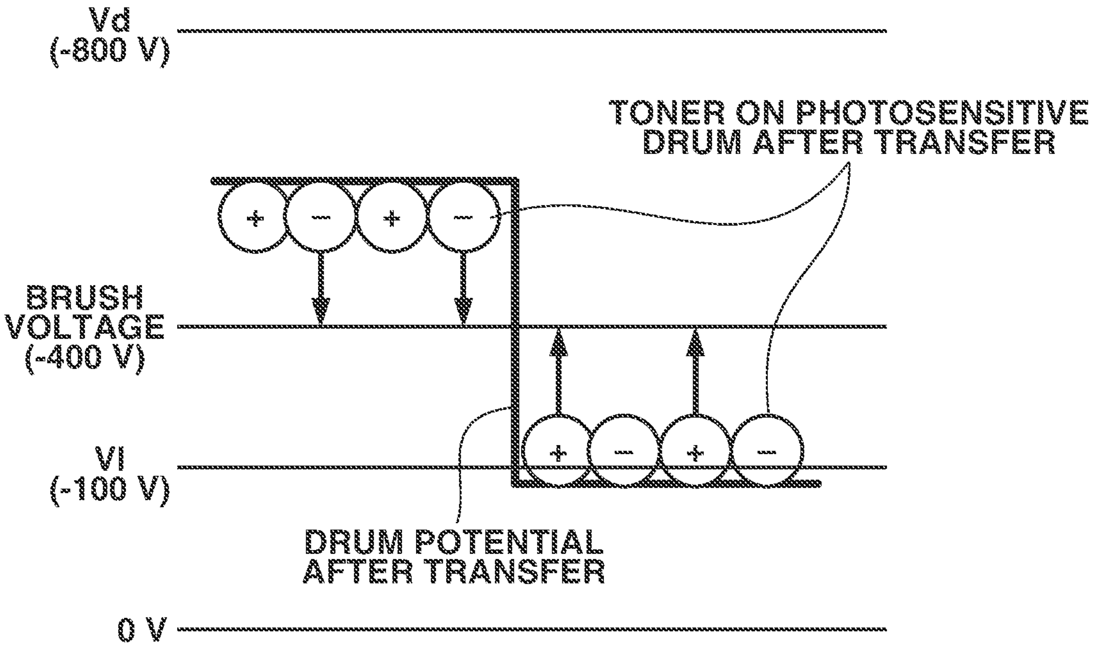
FIG. 4 is a diagram illustrating an electrostatic movement of toner due to a drum potential and a brush voltage according to the first exemplary embodiment.

For example, the present exemplary embodiment employs an image forming apparatus 100 where the brush voltage is set to be sufficiently lower than the non-image portion potential Vd and higher than the image portion potential V1. As illustrated in FIG. 4, if the surface potential formed on the photosensitive drum 1 is lower (smaller in absolute value) than the brush voltage, toner of positive polarity tends to move to the brush 10. By contrast, if the surface potential of the photosensitive drum 1 is higher (larger in absolute value), toner of negative polarity tends to move electrostatically to the brush 10. The greater the potential difference, the more pronounced the tendency. However, the potential difference from the brush voltage is not uniquely determinable, because the surface potential of the photosensitive drum 1 entering the brush 10 after transfer varies depending on the difference in the image portion potential V1 or the non-image portion potential Vd, and the setting of the transfer voltage at the transfer portion.

As a result, two types of toner, toner charged to positive polarity and toner charged to negative polarity, always accumulate on the brush 10, whereas the ratio depends on the polarities of the fog toner and the transfer residual toner.

Next, the tendency of the fog toner at the developing portion according to the present exemplary embodiment will be described. To examine the tendency of the fog toner at the developing portion of the image forming apparatus 100 according to the present exemplary embodiment, a fog toner concentration (%) on the surface of the photosensitive drum 1 was measured in the following manner.

Initially, the image forming apparatus 100 according to the present exemplary embodiment was activated in the same manner as with a print operation. Desired latent image settings were made by setting the charging voltage and the developing voltage to the above-described conditions. The rotational driving of the photosensitive drum 1 was then stopped. After the rotation driving of the photosensitive drum 1 was stopped, a polyester tape (manufactured by NICHIBAN Co., Ltd., No. 5511) was attached to the surface of the photosensitive drum 1 between the developing portion and the transfer portion in the direction of rotation of the photosensitive drum 1. The attached tape was peeled off to sample the fog toner on the surface of the photosensitive drum 1. The fog toner on the surface of the photosensitive drum 1 was sampled a plurality of times with different latent image settings, where a back contrast Vback, or a difference between the surface potential of the photosensitive drum 1 at the developing portion and the developing voltage, was set as appropriate from 50 V to 500 V in steps of 50 V. The strips of tape with the sampled fog toner from the surface of the photosensitive drum 1 were attached to Xerox Vitality Multipurpose Paper (Letter size, 20 lbs.). A degree of whiteness D1 (%) of the areas where the strips were attached and a degree of whiteness D2 (%) of the areas where the strips were not attached were measured using a fogging measuring instrument (product name: REFLECTOMETER MODEL TC-6DS, manufactured by Tokyo Denshoku Co., Ltd.). From the measurements, "D2(%)−D1(%)" was calculated as a fog toner concentration (%).

In such a manner, the fog toner concentration (%) on the surface of the photosensitive drum 1 was measured when the image forming apparatus 100 according to the present exemplary embodiment was new, i.e., when the toner was new, after printing of a total of 30 sheets, and after printing of a total of 100 sheets.

Figure 5:
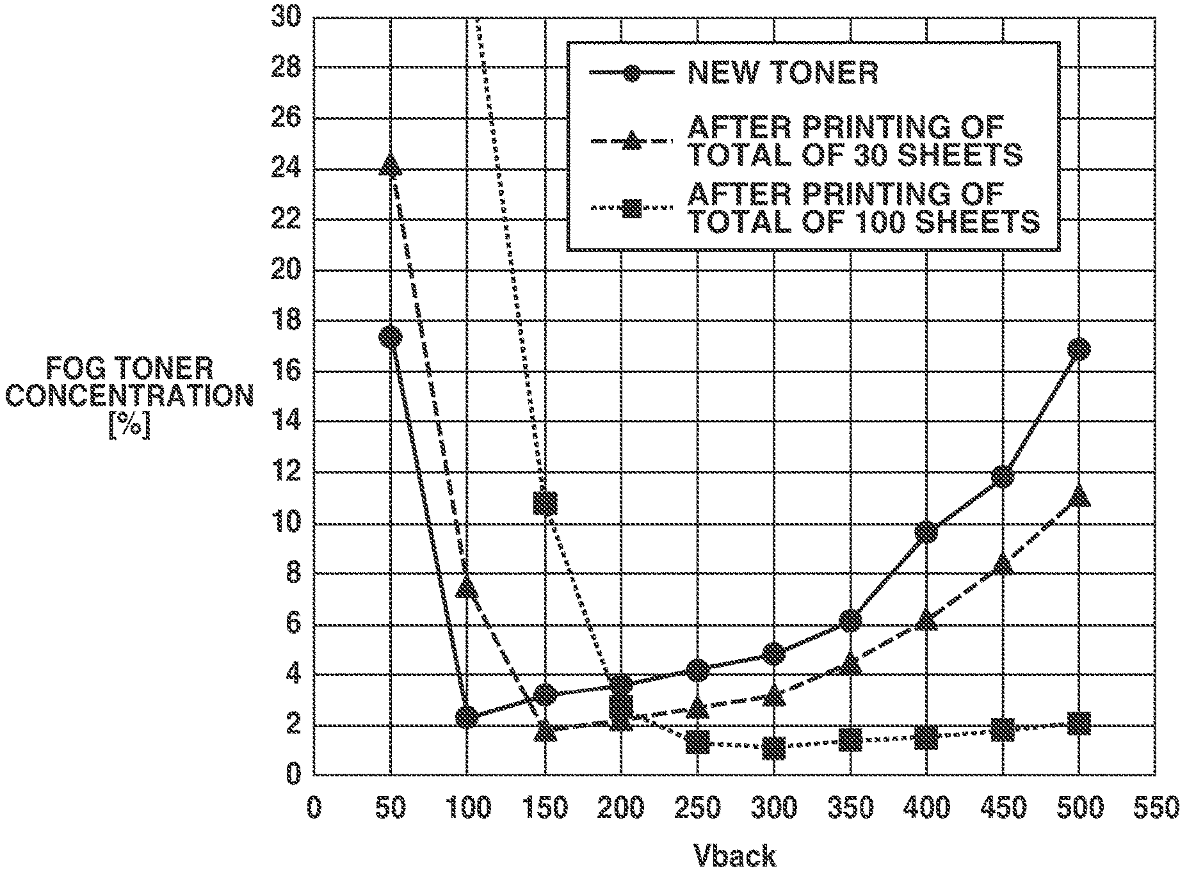
FIG. 5 is a chart illustrating a change in a fogging characteristic depending on a cumulative number of printed sheets after the start of using the new toner in a new condition according to the first exemplary embodiment.

FIG. 5 illustrates the measurement results of the fog toner concentration (%) on the surface of the photosensitive drum 1 of the image forming apparatus 100 according to the present exemplary embodiment. As illustrated in FIG. 5, in a new toner state corresponding to when the image forming apparatus 100 is new, the fog toner on the surface of the photosensitive drum 1 tends to increase as the back contrast Vback increases. It can thus be seen that fogging due to toner (hereinafter, reversal toner) charged to positive polarity opposite to the normal polarity of the toner (hereinafter, reversal fogging) occurs easily on the surface of the photosensitive drum 1. As illustrated in FIG. 5, as the cumulative number of sheets printed by the image forming apparatus 100 increases, reversal fogging occurs less even at high back contrast Vback. The reason is that if the condition of the image forming apparatus 100 or the toner is closer to a new condition, the ratio of toner that is not sufficiently charged to the normal polarity is higher and such toner is more likely to become reversal toner due to a potential difference at the developing portion.

As illustrated in FIG. 5, in the state where the image forming apparatus 100 is new, the fog toner on the surface of the photosensitive drum 1 is less likely to increase at low back contrast Vback. In other words, it can be seen that fogging due to toner charged to negative polarity that is the normal polarity (hereinafter, normal fogging) is less likely to occur on the surface of the photosensitive drum 1. As illustrated in FIG. 5, it can also be seen that as the cumulative number of sheets printed by the image forming apparatus 100 increases, normal fogging becomes more likely to occur at the same Vback in the range where Vback is lower than approximately 200 V. The reason is that the longer the image forming apparatus 100, i.e., the toner is used, the more sufficiently the toner is charged to normal polarity and the less likely reversal toner is to occur due to the potential difference at the developing portion.

As described above, the closer to the initial state the image forming apparatus 100 or the toner is, the more likely reversal fogging occurs and the less likely normal fogging occurs. It can be seen that the longer the image forming apparatus 100, i.e., the toner, is used, the less likely reversal fogging occurs and the more likely normal fogging occurs.

Transfer residual toner is considered to have a similar tendency to that of the fog toner in terms of the change in polarity. Specifically, if the same transfer voltage is applied, transfer residual toner is more likely to be reversal and includes a higher proportion of toner of positive polarity when the condition of the toner is closer to the new condition. Transfer residual toner becomes less likely to be reversal as the cumulative number of printed sheets increases. In other words, as the cumulative number of printed sheets increases, toner of negative polarity becomes more likely to reside.

The polarity of the toner accumulated on the brush 10 described above also changes with the foregoing change in the polarity of the fog toner and transfer residual toner in the initial stage when the image forming apparatus 100 is new. Specifically, if the condition of the image forming apparatus 100 is closer to the new condition, the ratio of toner of positive polarity accumulated on the brush 10 is higher. As the cumulative number of printed sheets increases, the ratio of toner of negative polarity increases.

Next, the transfer of the toner accumulated on the brush 10 to the surface of the photosensitive drum 1 (toner discharge) will be described. In the present exemplary embodiment, toner discharge caused by a change in the surface potential of the photosensitive drum 1 when the trailing edge of a recording material S passes the transfer portion will be described with reference to FIGS. 6 and 7.

Figure 6:
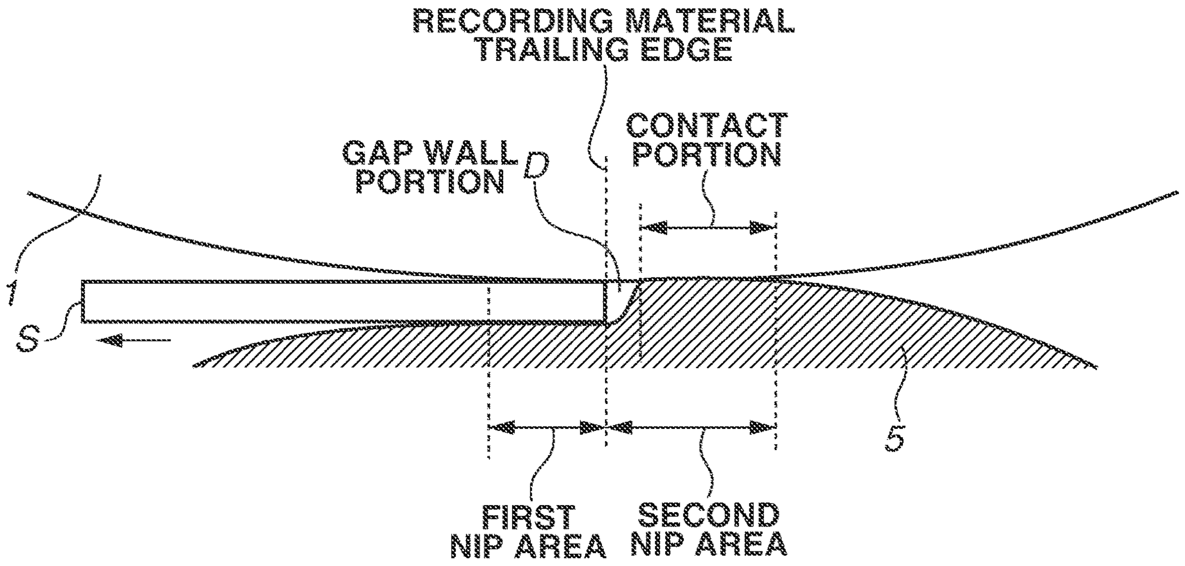
FIG. 6 is a diagram illustrating nip areas when a recording material is passing a transfer nip portion according to the first exemplary embodiment.

Initially, nip areas when the trailing edge of a recording material S is passing the transfer portion (transfer nip portion) according to the present exemplary embodiment will be described with reference to FIG. 6. FIG. 6 is a sectional view near the transfer nip portion when the trailing edge of the recording material S is passing the transfer nip portion. In the present exemplary embodiment, a transfer nip area where the recording material S is interposed between the photosensitive drum 1 and the transfer roller 5 in the conveyance direction of the recording material S will be referred to as a first nip area (first area). A transfer nip area where the recording material S is not interposed will be referred to as a second nip area (second area).

In the present exemplary embodiment, whether the recording material S is interposed in the conveyance direction of the recording material S is determined depending on whether the recording material S is present in a longitudinal direction perpendicular to the conveyance direction of the recording material S within the transfer nip surface.

The second nip area is divided into a gap wall portion D formed at the end of the recording material S as illustrated in FIG. 6 and a contact portion where the photosensitive drum 1 and the transfer roller 5 are in contact with each other.

Figure 7:
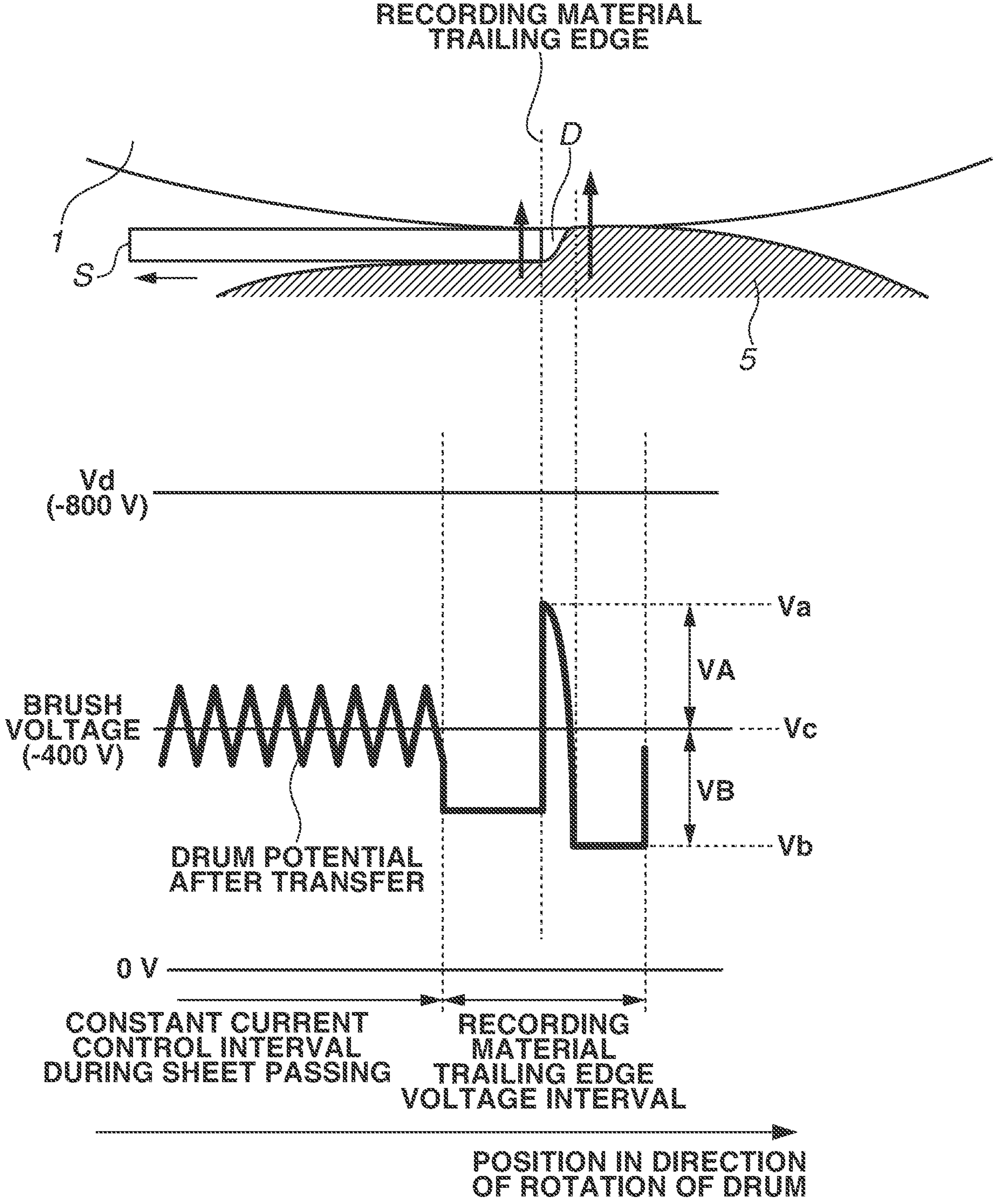
FIG. 7 is a diagram illustrating a sectional view of the transfer portion when the recording material passes the transfer portion and a relationship between the drum potential after transfer and the brush voltage according to the first exemplary embodiment.

Next, a relationship between the surface potential of the photosensitive drum 1 after transfer and the brush voltage when the recording material S passes the transfer portion will be described with reference to FIG. 7. FIG. 7 is a diagram illustrating a sectional view of the transfer portion when the recording material S passes the transfer portion and the relationship between the surface potential of the photosensitive drum 1 after transfer and the brush voltage. The surface potential of the photosensitive drum 1 after transfer illustrated in FIG. 7 indicates the potential in a constant current control interval during sheet passing and the potential in an interval where the recording material trailing edge voltage is applied (recording material trailing edge voltage interval). In the interval where the recording material trailing edge voltage is applied, the surface potential of the photosensitive drum 1 temporarily jumps to the negative polarity side at timing when the recording material trailing edge passes, i.e., when the first nip area is switched to the second nip area. The reason is that the difference in the physical level at the trailing edge of the recording material S produces the small gap wall portion D between the surface of the photosensitive drum 1 and the transfer roller 5, where the surface potential of the photosensitive drum 1 is less likely to be attenuated locally. The surface potential after transfer at the surface of the photosensitive drum 1 corresponding to the gap wall portion D will be denoted by Va.

In the recording material trailing edge voltage interval, the constant voltage control produces a difference in the surface potential of the photosensitive drum 1 before and after recording material trailing edge passes the transfer portion. The reason is that the resistance of the transfer portion varies depending on the presence or absence of the recording material S. The contact portion after the passing of the recording material S passes a current from the photosensitive drum 1 to the transfer roller 5. The surface potential of the photosensitive drum 1 in the contact portion therefore drops. The surface potential after transfer on the surface of the photosensitive drum 1 corresponding to the contact portion will be denoted by Vb.

The brush voltage applied to the brush 10 will be denoted by Vc.

In light of the foregoing, toner discharge from the brush 10 due to a change in the surface potential of the photosensitive drum 1 will be described.

Figure 8A:
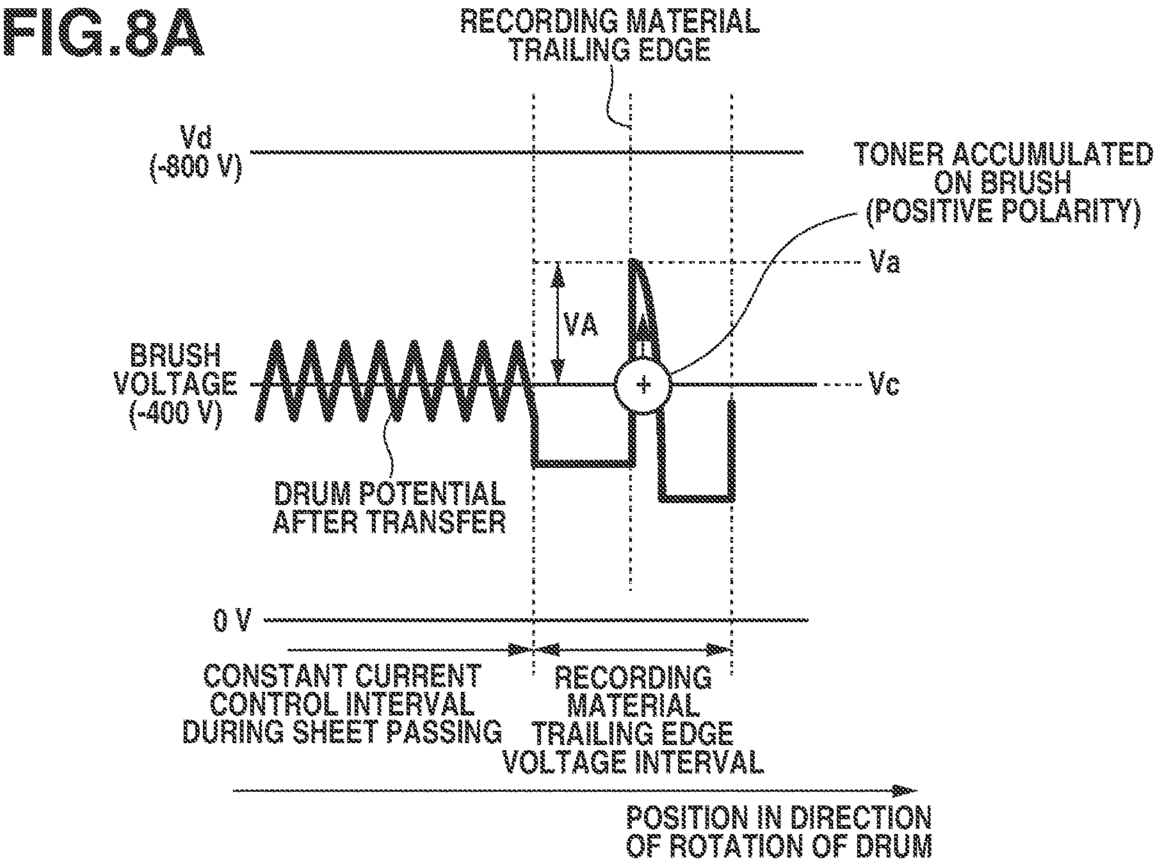
FIGS. 8A and 8B are diagrams illustrating the drum potential near the trailing edge of a recording material and toner discharge from the brush according to the first exemplary embodiment.

FIG. 8A illustrates a potential relationship in the case where there is a small gap wall portion D between the surface of the photosensitive drum 1 and the transfer roller 5 due to the difference in level of the recording material S when the recording material trailing edge passes the transfer portion. FIG. 8A illustrates how toner is discharged when the area of surface potential Va formed by the presence of the gap wall portion D where the surface potential of the photosensitive drum 1 is less likely to be attenuated passes the contact position with the brush 10.

Toner of positive polarity accumulated on the brush 10 is mostly discharged due to a potential difference VA (=Va−Vc) from the surface potential Va of the photosensitive drum 1 locally higher than the brush voltage Vc. The discharged toner of positive polarity then adheres to the charging roller 2 located downstream in the direction of rotation of the photosensitive drum 1, and the charging roller 2 temporarily rotates with the toner adhered thereon. As a result, a white streak-like image defect (hereinafter, lateral white streak) occurs at rotation periods of the charging roller 2. The greater the potential difference VA on the negative polarity side (the higher the surface potential Va on the negative polarity side), the more toner is discharged from the brush 10 and the worse the lateral white streak becomes. The more toner of positive polarity the toner accumulated on the brush 10 includes, the more toner is discharged to the surface of the photosensitive drum 1.

Figure 8B:
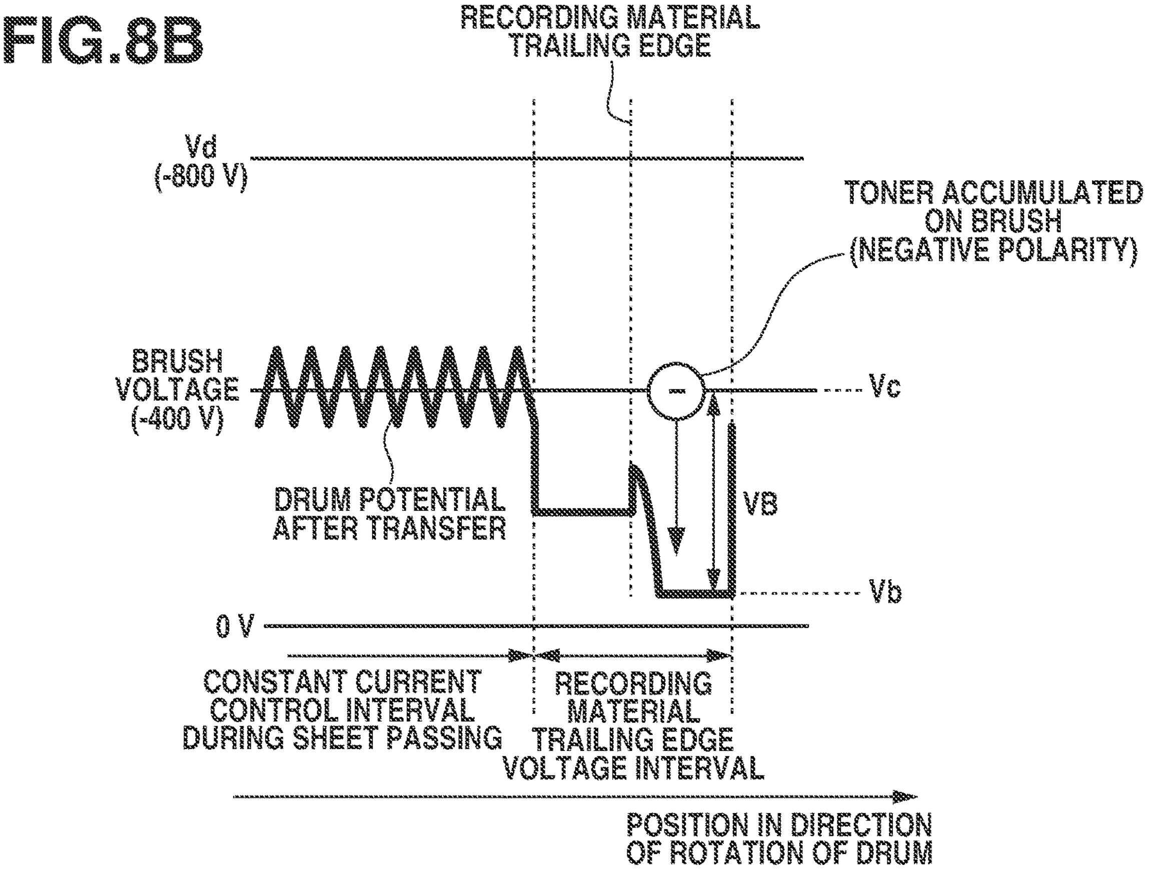

FIG. 8B illustrates a potential relationship in a case where a potential difference VB (=Vb−Vc) between the surface potential of the photosensitive drum 1 after the trailing edge of the recording material S passes the transfer portion and the brush voltage is large. FIG. 8B illustrates how toner is discharged when the area of the photosensitive drum 1 where the surface potential is Vb passes the contact position with the brush 10. In the area of the photosensitive drum 1 where the surface potential is Vb, toner of negative polarity accumulated on the brush 10 is mostly discharged. If too much toner to be collected at the developing portion is discharged and the sheet-to-sheet distance is smaller than the outer peripheral length of the photosensitive drum 1 as in the present exemplary embodiment, an image defect occurs in an image transferred near the leading edge of the subsequent recording material S (hereinafter, leading edge discharge). The greater the potential difference VB on the positive polarity side (the higher the surface potential Vb on the positive polarity side), the more toner is discharged and the worse the leading edge discharge becomes. The more toner of negative polarity the toner accumulated on the brush 10 includes, the more toner is discharged to the surface of the photosensitive drum 1.

If the polarity ratio of the toner accumulated on the brush 10 remains constant, the transfer voltage can be uniquely controlled so that the photosensitive drum 1 has an optimum surface potential to not cause a lateral white streak or a leading edge discharge. On the other hand, if the polarity ratio of the toner accumulated on the brush 10 changes with the cumulative number of printed sheets because of the foregoing change in the polarity of fog toner, the optimum surface potential of the photosensitive drum 1 at which a lateral white streak or a leading edge discharge does not occur changes. The potential difference formed between the surface potential of the photosensitive drum 1 and the brush voltage therefore needs to be controlled accordingly.

7. Control and Effect of Present Exemplary Embodiment

In view of the foregoing issue, in the present exemplary embodiment, the following control is performed to deal with the electrostatic sensitivity of the toner discharge from the brush 10 that changes with a change in the potential of the photosensitive drum 1 due to the polarity change of the toner accumulated on the brush 10. Characteristically, the surface potential of the photosensitive drum 1 is controlled by switching the transfer voltage to be applied to the recording material trailing edge based on the cumulative number of sheets printed by the image forming apparatus 100 that is used as information about the user of toner.

Figure 9A:
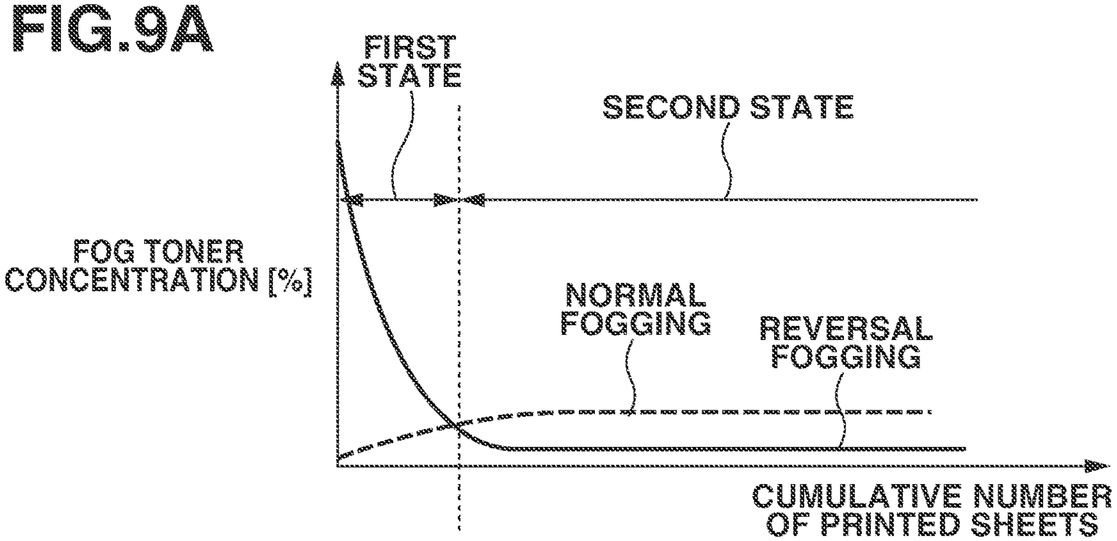
FIGS. 9A and 9B are diagrams illustrating the cumulative number of printed sheets, transition of fog toner, and recording material trailing edge voltage control according to the first exemplary embodiment.
Figure 9B:
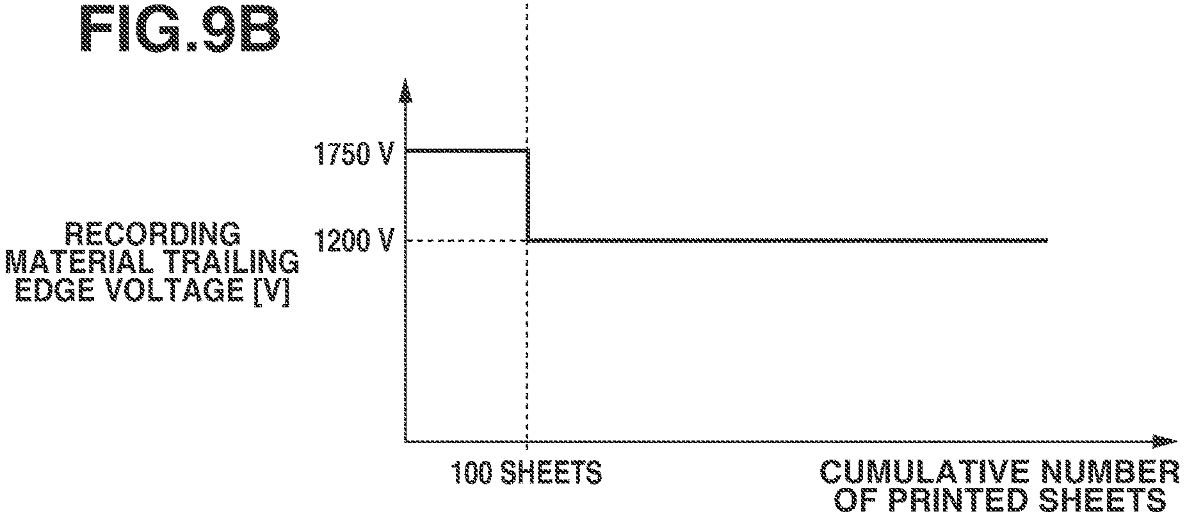

Details of the present exemplary embodiment will be described below with reference to FIGS. 9A and 9B. FIG. 9A is a diagram illustrating the transitions of a normal fog toner concentration and a reversal fog toner concentration predicted from the fogging characteristic depending on the cumulative number of printed sheets illustrated in FIG. 5, with the cumulative number of printed sheets on the horizontal axis. In the present exemplary embodiment, as illustrated in FIG. 9A, the reversal fogging (fogging with toner of positive polarity) tends to decrease, and normal fogging (fogging with toner of negative polarity) tends to increase with the passing of sheets. Specifically, the tendency of each type of fogging stabilizes at approximately 100 sheets. As described above, the polarity ratio of the toner accumulated on the brush 10 transitions similarly to that of the fog toner. Specifically, from when the image forming apparatus 100 is new to when the number of printed sheets reaches approximately 100 sheets, lateral white streaks are likely to occur since toner of positive polarity is higher in ratio and amount. After approximately 100 sheets, toner of negative polarity becomes higher in ratio. This facilitates the occurrence of a leading edge discharge. In the present exemplary embodiment, as illustrated in FIG. 9B, the recording material trailing edge voltage is thus switched when the cumulative number of printed sheets reaches 100 which is set as a threshold. More specifically, the transfer voltage at the recording material trailing edge is set at a relatively high transfer voltage capable of preventing lateral white streaks up to the 100th sheet, and switched to a relatively low transfer voltage capable of preventing a leading edge discharge at and after the 101st sheet. In FIGS. 9A and 9B, the state of toner up to the cumulative number of printed sheets of 100 is referred to as a first state, and the state of toner at and after the 101st sheet where the toner has been used longer than in the first state is referred to as a second state. While the foregoing description has been given in terms of the number of sheets printed after the start of using the new image forming apparatus 100, the present exemplary embodiment may be similarly applied to a case where the developer container 33 is new or a configuration where the developer container 33 is replenished with new toner as will be described in a third exemplary embodiment.

8. Effect

Next, a result of a sheet passing test conducted to examine the effect of the present exemplary embodiment will be described. The sheet passing test was performed under the following condition. In an environment of 23° C. in temperature and 50% in relative humidity, the following test was conducted using Xerox Vitality Multipurpose Paper (Letter size, 20 lbs.) as recording materials S. A two-sheet intermittent print job of leaving the entire first sheet blank and printing a 50%-density halftone image on the second sheet was repeated to a total of 200 sheets, and the second sheet of each job was checked for a lateral white streak and a leading edge discharge. Here, the transfer voltage at the recording material trailing edge according to the present exemplary embodiment was set to approximately 1750 V up to the 100th sheet, and approximately 1200 V at and after the 101st sheet as illustrated in FIG. 9B. In this sheet passing test, a resistance detection voltage V1 during the sheet passing described above was approximately 1100 V. The output values of the respective recording material trailing edge voltages were calculated by multiplying the resistance detection voltage V1 by 1.59 up to the 100th sheet, and multiplying the resistance detection voltage V1 by 1.09 at and after the 101st sheet.

Table 1 illustrates the result of the foregoing sheet passing test conducted on a first comparative example where the transfer voltage at the recording material trailing edge was fixed at 1750 V, a second comparative example where the transfer voltage was fixed at 1200 V, and the present exemplary embodiment.

TABLE 1

| | From new condition to 100th sheet (lateral white streak) | From 101st to 200th sheet (leading edge discharge) |
|---|---|---|
| Present exemplary embodiment | OK | OK |
| First comparative example | OK | NG |
| Second comparative example | NG | OK |

The result of Table 1 shows that in the first comparative example, a leading edge discharge occurred when the number of printed sheets is 101 to 200. In the second comparative example, a lateral white streak occurred before the number of printed sheets reaches 100 sheets after the condition of the image forming apparatus 100 was new. By contrast, neither of the image defects occurred in the present exemplary embodiment.

Figure 10B:
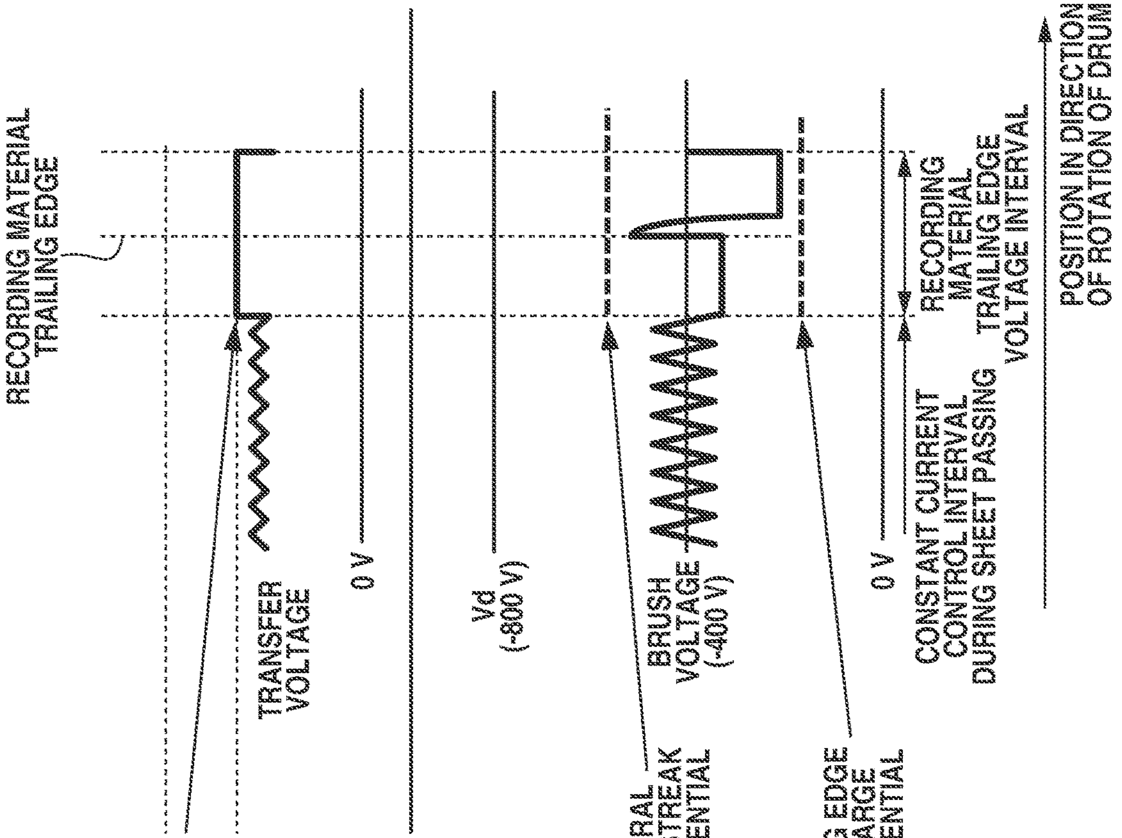
FIGS. 10A and 10B are diagrams illustrating a relationship between a transfer voltage and the drum potential according to the first exemplary embodiment.
Figure 10A:
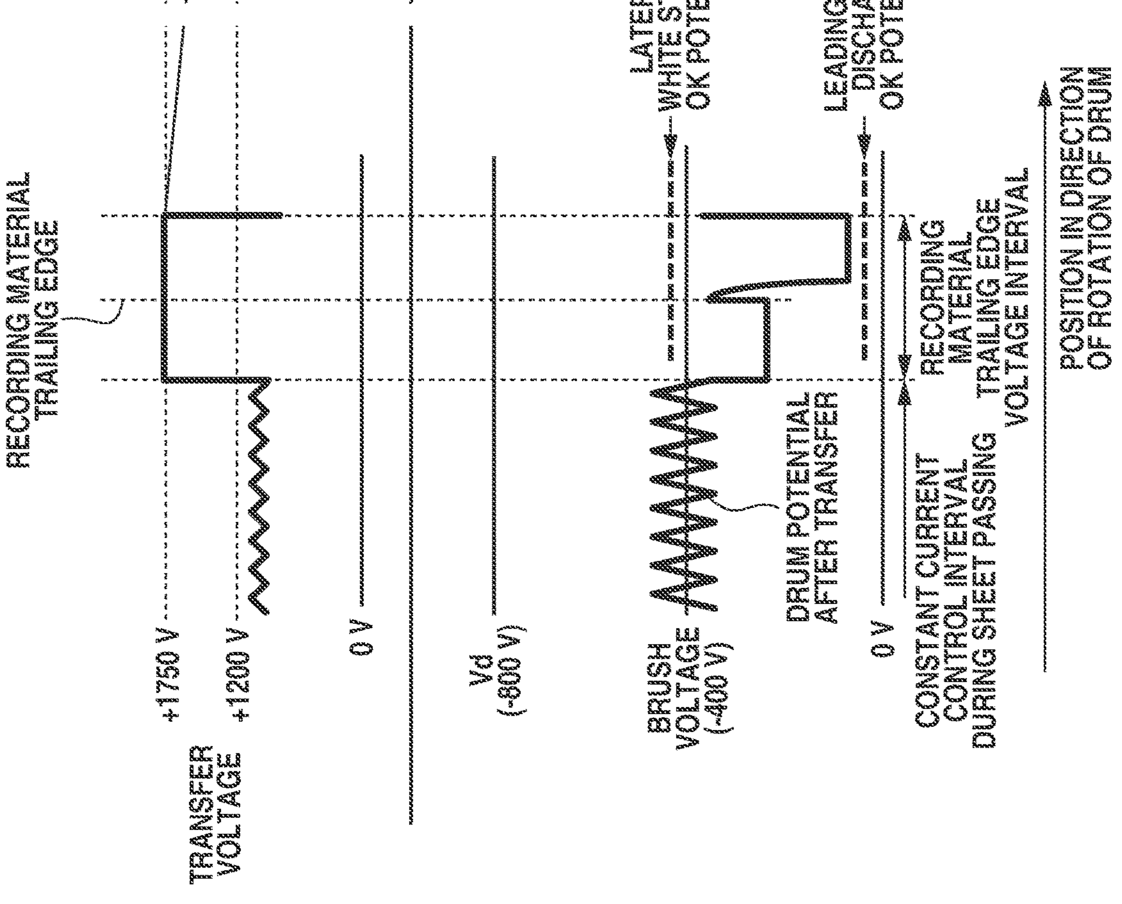

In the present exemplary embodiment, the recording material trailing edge voltage is switched from that in FIG. 10A to that in FIG. 10B at the cumulative number of printed sheets of 100. The lower halves of FIGS. 10A and 10B illustrate the surface potential of the photosensitive drum 1 corresponding to the position where the transfer voltage illustrated in the upper halves is applied. Lateral white streak and leading edge discharge OK potentials illustrated in FIG. 10A are those immediately after the new condition. In the present exemplary embodiment, the relatively high recording material trailing edge voltage (+1750 V) is applied to control the surface potential of the photosensitive drum 1 after transfer within the range of the OK potentials. The lateral white streak and leading edge discharge OK potentials illustrated in FIG. 10B are those after 150 sheets. In the present exemplary embodiment, the relatively low recording material trailing edge voltage (+1200 V) is applied to control the drum potential after transfer within the range of the OK potentials. The change in the charge polarity of the toner held on the brush 10 depending on the number of printed sheets can thus be dealt with by switching the recording material trailing edge voltage based on the number of printed sheets. If the condition of the toner is closer to the new condition, the ratio of toner not sufficiently charged to the normal polarity is higher. Such toner is likely to be reversal toner due to the potential difference at the developing portion, and the reversal toner accumulates on the brush 10. In the state where the number of sheets printed from the new condition is relatively small, control is thus performed to form an electric field for preventing the movement of reversal toner, i.e., toner of positive polarity in the present exemplary embodiment, from the brush 10 to the surface of the photosensitive drum 1. As illustrated in FIG. 10A, the margin for a lateral white streak is thus smaller than the margin in FIG. 10B illustrating the potential relationship after the number of printed sheets of 100 to be described below. The longer the toner is used, the more sufficiently the toner is charged to the normal polarity and the less likely reversal toner is to occur due to the potential difference at the developing portion. Since reversal fogging becomes less likely to occur and normal fogging more likely to occur, the ratio of the toner of normal polarity accumulated on the brush 10 increases. In the state where a sufficient number of sheets has been printed from the new condition, control is thus performed to form an electric field for preventing the movement of normal fog toner, i.e., toner of normal polarity in the present exemplary embodiment, from the brush 10 to the surface of the photosensitive drum 1. As illustrated in FIG. 10B, the margin for a leading edge discharge is thus smaller than the margin in FIG. 10A illustrating the potential relationship up to the number of printed sheets of 100.

As described above, the polarity of the toner accumulated on the brush 10 changes and the range of the lateral white streak and leading edge discharge OK potentials shifts depending on the cumulative number of printed sheets. The shift in the range of the lateral white streak and leading edge discharge OK potentials is unable to be dealt with by the constant transfer voltage setting as in the comparative examples. In the present exemplary embodiment, the occurrence of the lateral white streak and the leading edge discharge can be prevented by switching the recording material trailing edge voltage based on the cumulative number of printed sheets.

The image forming apparatus 100 according to the first exemplary embodiment has the following configuration and characteristics.

The image forming apparatus 100 includes the rotatable photosensitive drum 1, the charging roller 2 that charges the surface of the photosensitive drum 1 at the charging portion opposed to the surface of the photosensitive drum 1, and the developing roller 31 that supplies toner charged to normal polarity to the surface of the photosensitive drum 1. The image forming apparatus 100 further includes the transfer roller 5 that comes into contact with the photosensitive drum 1 to form the transfer portion, and sandwiches and conveys a recording material S and transfers the toner supplied to the photosensitive drum 1 to the recording material S at the transfer portion, and the transfer voltage application unit (transfer voltage power supply) 160 that applies the transfer voltage having polarity opposite to the normal polarity to the transfer roller 5. The image forming apparatus 100 further includes the brush 10 that comes into contact with the surface of the photosensitive drum 1 to form the brush portion downstream of the transfer portion and upstream of the charging portion in the direction of rotation of the photosensitive drum 1, and the brush voltage application unit (brush power supply) 130 that applies the brush voltage of the normal polarity to the brush 10. The image forming apparatus 100 further includes the memory 154 that stores information about the use of the toner, and the control unit 200 that controls the transfer voltage application unit 160 and the brush voltage application unit 130. The developing roller 31 is configured to, after the toner supplied to the photosensitive drum 1 is transferred to the recording material S at the transfer portion, collect toner remaining on the surface of the photosensitive drum 1.

In a state where the leading edge of the recording material S in the conveyance direction of the recording material S or the trailing edge of the recording material S in the conveyance direction is sandwiched at the transfer portion, the area of the photosensitive drum 1 in the conveyance direction where the recording material S is sandwiched in the direction perpendicular to the conveyance direction at the transfer portion is referred to as the first area. The area of the photosensitive drum 1 in the conveyance direction where the recording material S is not sandwiched in the direction perpendicular to the conveyance direction is referred to as the second area. A potential difference formed between the surface potential formed on the second area and the brush voltage in a case where the second area reaches the brush portion, which is determined based on first information stored in the memory 154, is referred to as a first potential difference.

A potential difference formed between the surface potential formed on the second area and the brush voltage in the case where the second area reaches the brush portion, which is determined based on second information stored in the memory 154 and different from the first information, is referred to as a second potential difference. In such a case, the control unit 200 performs control so that the first potential difference and the second potential difference are different.

The second area includes the gap wall portion D formed at the leading edge of the recording material S or the trailing edge of the recording material S and the contact portion where the photosensitive drum 1 and the transfer roller 5 are in contact with each other. The surface potential of a first surface that is the surface of the photosensitive drum 1 forming the gap wall portion D when the first surface reaches the brush portion is denoted by Va. The surface potential of a second surface that is the surface of the photosensitive drum 1 forming the contact portion when the second surface reaches the brush portion is denoted by Vb, and the brush voltage is denoted by Vc. In such a case, a potential difference formed between the surface potential of the first surface at the brush portion and the brush voltage, i.e., Va-Vc, is denoted by VA. A potential difference formed between the surface potential of the second surface at the brush portion and the brush voltage, i.e., Vb-Vc, is denoted by VB. The control unit 200 may sequentially control switching of the transfer voltage or the brush voltage to control the potential differences VA and VB. Here, the control unit 200 desirably makes the potential difference VA greater and the potential difference VB smaller in using the second information than in using the first information. In the present exemplary embodiment, the control unit 200 controls the recording material trailing edge voltage including the first and second areas to set the potential differences VA and VB within a suitable range.

The second information is information about the toner that is used longer than the toner in the first information. In forming the first potential difference based on the second information, the control unit 200 performs control so that the surface potential formed on the second area has an absolute value smaller than that of the brush voltage. The control unit 200 performs control so that the transfer voltage in forming the second potential difference at the contact portion is lower than in forming the first potential difference at the contact portion. In the present exemplary embodiment, if the second area forms the transfer portion, the control unit 200 performs control so that a first transfer voltage applied based on the first information stored in the memory 154 and a second transfer voltage applied based on the second information stored in the memory 154 are different. Specifically, the control unit 200 performs control so that the first transfer voltage has an absolute value greater than that of the second transfer voltage.

In the present exemplary embodiment, the recording material trailing edge voltage is switched to deal with the toner discharge from the brush 10. It will be understood, however, that if the brush voltage is variable, similar effects can be obtained by switching the brush voltage to control the potential difference between the surface potential of the photosensitive drum 1 after transfer and the brush voltage. The control unit 200 may perform control 0 so that the brush voltage in forming the second potential difference is lower than in forming the first potential difference. The control unit 200 may perform control so that a first brush voltage applied based on the first information stored in the memory 154 and a second brush voltage applied based on the second information stored in the memory 154 are different. Specifically, the control unit 200 may perform control so that the first brush voltage is higher than the second brush voltage.

While the control performed when the trailing edge of the recording material S passes the transfer nip portion has been described in the present exemplary embodiment, it will be understood that similar effects can be obtained by performing control when the leading edge of the recording material S passes the transfer nip portion.

The foregoing configuration of the first exemplary embodiment can prevent an image defect resulting from toner accumulated on the brush 10.

While in the present exemplary embodiment the recording material trailing edge voltage is switched based on a predetermined cumulative number of printed sheets as the threshold, this is not restrictive. For example, the recording material trailing edge voltage may be continuously changed based on the cumulative number of printed sheets.

While in the present exemplary embodiment the recording material trailing edge voltage is switched based on the cumulative number of printed sheets, this is not restrictive. For example, the cumulative number of rotations of the developing roller 31 may be used. Since the change in the polarity of the fog toner is caused by a change in the charging state of the toner due to friction in the developer container 33, the cumulative number of rotations is more direct than the cumulative number of printed sheets and even desirable in terms of accuracy. The cumulative number of rotations of the developing roller 31 will be described in detail in a second exemplary embodiment.

Alternatively, information about the remaining level of toner in the developer container 33 accommodating the toner may be used.

Next, a second exemplary embodiment of the present disclosure will be described. A basic configuration and operation of an image forming apparatus according to the second exemplary embodiment are similar to those of the image forming apparatus 100 according to the first exemplary embodiment. Components of the image forming apparatus of the second exemplary embodiment having functions or configuration similar or corresponding to those of the image forming apparatus 100 of the first exemplary embodiment are thus denoted by the same reference numerals as with the image forming apparatus 100 of the first exemplary embodiment. A detailed description thereof will be omitted.

In the first exemplary embodiment, the switching control of the recording material trailing edge voltage based on the change in the polarity of fog toner from the new condition has been described. In the present exemplary embodiment, switching control of the recording material trailing edge voltage based on a change in the polarity of fog toner due to toner degradation will be described.

The toner in the developer accommodation chamber 33 degrades gradually due to mechanical damage from agitation and sliding friction against the developing blade 34. Specifically, the toner drops in chargeability because of omission or embedding of additives contributing to the toner chargeability, or deformation of the toner itself. Such toner degradation worsens as the cumulative number of rotations of the developing roller 31 increases from the new condition.

In the present exemplary embodiment, the use amount of the developing roller 31 is used as an index for determining the cumulative number of rotations of the developing roller 31. It will be understood that the cumulative number of printed sheets may be used as described in the first exemplary embodiment.

The use amount of the developing roller 31 is defined by the following Eq. 1:

The use amount of the developing roller 31=the cumulative number of rotations of the developing roller 31÷the total number of rotations of the developing roller 31 at which an image defect can occur×100 (%). (Eq. 1)

Here, the use amount of a new developing roller 31 is 0%, and the use amount of the developing roller 31 at which an image defect such as a blank dot and a vertical streak can occur is 100%.

Next, a sheet passing test conducted to examine the use amount of the developing roller 31 and a change in the characteristic of fog toner according to the present exemplary embodiment will be described. The sheet passing test was performed under the following condition. In an environment of 23° C. in temperature and 50% in relative humidity, 5000 sheets were passed by two-sheet intermittent printing of an image with a printing ratio of 4%, using Xerox Vitality Multipurpose Paper (Letter size, 20 lbs.) as recording materials S. The amount of toner in a new developer accommodation chamber 33 was 100 g. It was assumed that when the sheet passing test consumed 80 g of the toner, the use amount of the developing roller 31 was considered to reach 100%.

Figure 11:
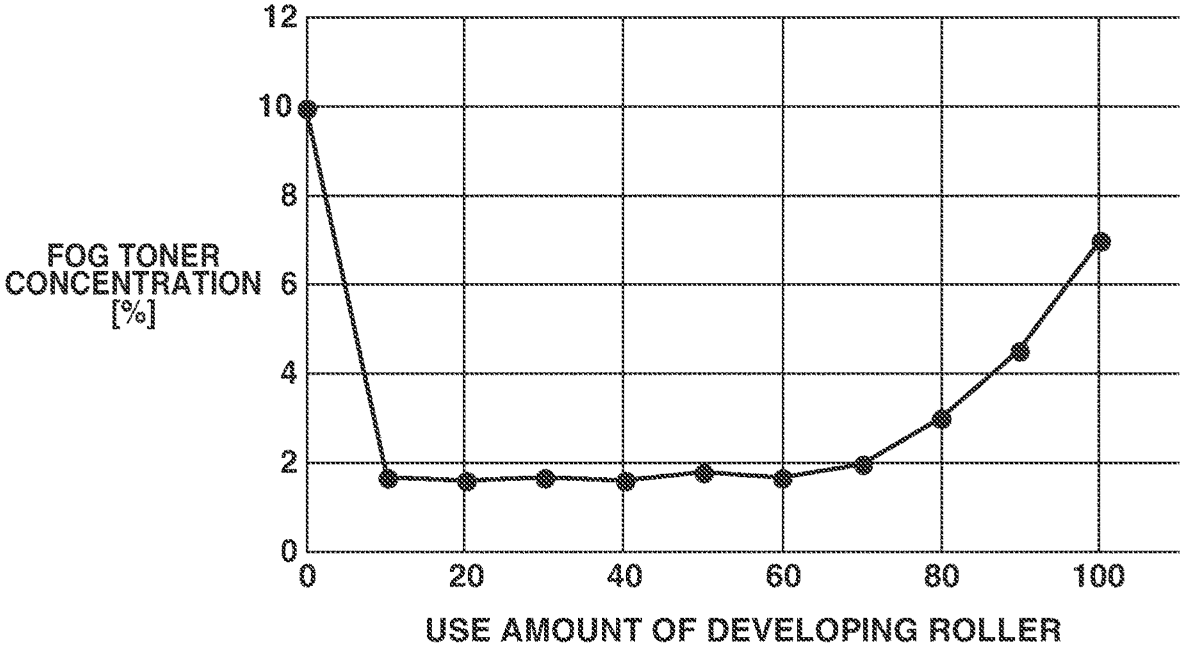
FIG. 11 is a chart illustrating the use amount of a developing roller and the transition of fog toner according to a second exemplary embodiment.

In the process where the use amount of the developing roller 31 reached 100% in the foregoing test, the fog toner concentration was measured by using the same measurement method as in the first exemplary embodiment. FIG. 11 illustrates the measurement result. Like the first exemplary embodiment, the values of the fog toner concentration in FIG. 11 were measured with a back contrast Vback at 400 V. As illustrated in FIG. 11, in the sheet passing test, the fog toner concentration turned upward and continued to increase up to 100% after the cumulative number of rotations of the developing roller 31 increased due to sheet passing and the use amount of the developing roller 31 exceeded approximately 80%. Like the toner in the new condition according to the first exemplary embodiment, most of such fog toner in the present exemplary embodiment is reversal fog toner, and most of the toner accumulated on the brush 10 thus has a positive polarity. As a result, the toner discharge illustrated in FIG. 8A can occur.

Figure 12A:
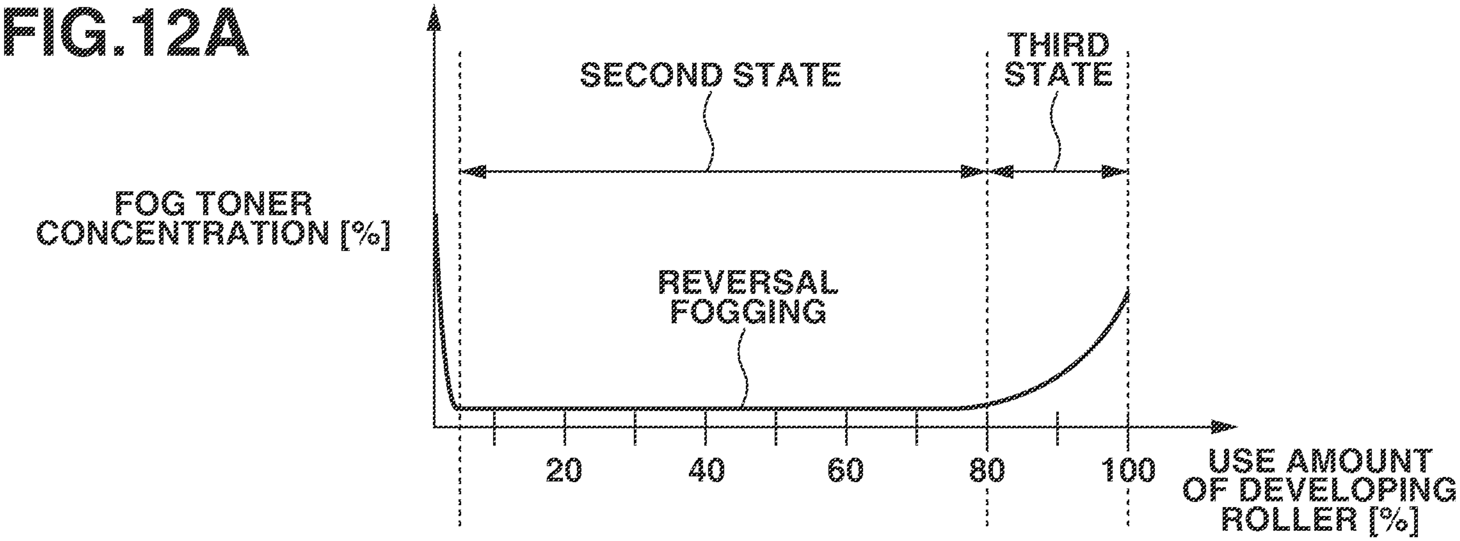
FIGS. 12A and 12B are diagrams illustrating the use amount of the developing roller, the transition of fog toner, and recording material trailing edge voltage control according to the second exemplary embodiment.
Figure 12B:
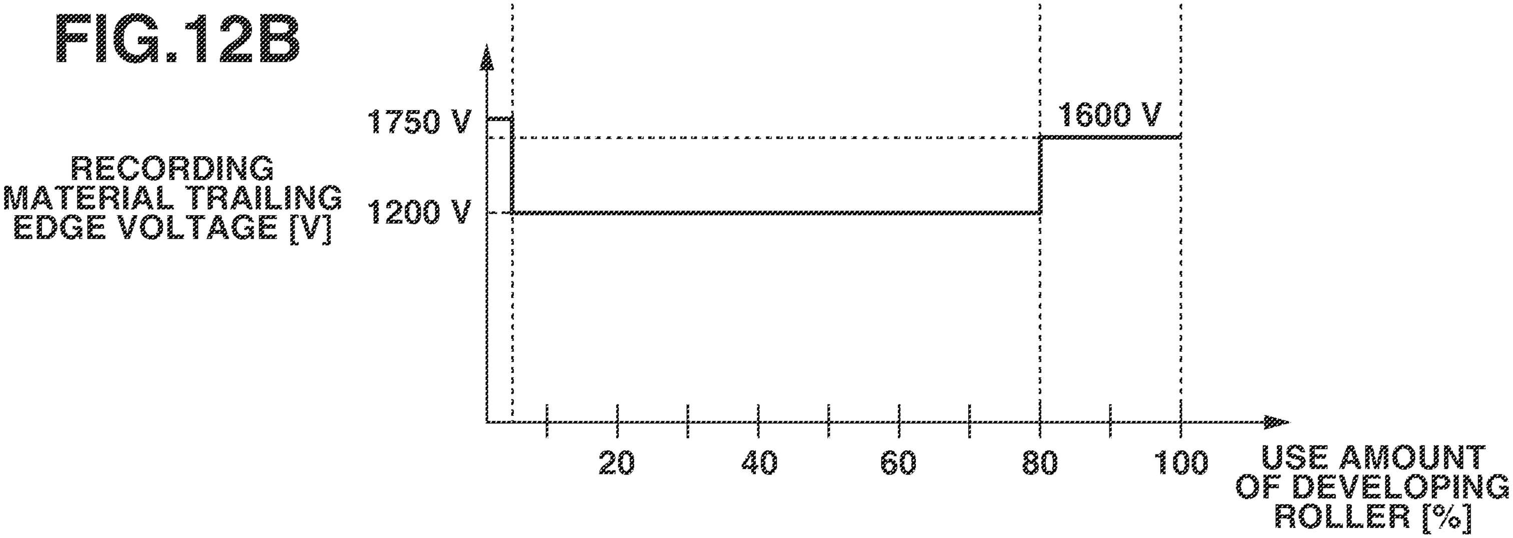

As can be seen from the result of FIG. 11, in the present exemplary embodiment, the transition of the fog toner concentration with respect to the use amount of the developing roller 31 is that of reversal fogging as illustrated in FIG. 12A. The recording material trailing edge voltage is thus switched based on the use amount of the developing roller 31 as illustrated in FIG. 12B. This can prevent the toner discharge illustrated in FIG. 8A. In FIGS. 12A and 12B, the state where the use amount of the developing roller 31 is up to 80% is illustrated as a second state. The state where the developing roller 31 is used more than in the second state, i.e., beyond the use amount of 80% is illustrated as a third state.

The image forming apparatus 100 according to the second exemplary embodiment has the following configuration and characteristics.

The control unit 200 performs the following control in controlling a third potential difference formed between the surface potential formed on the second area and the brush voltage in a case where the second area reaches the brush portion, which is determined based on third information about the toner that is used longer than the toner in the second information. The information about the use of the toner may be use information about the developing roller 31.

In forming the third potential difference, the control unit 200 performs control so that the surface potential formed on the second area has an absolute value smaller than that of the brush voltage. It is important to control the transfer voltage in forming the third potential difference at the contact portion to be higher than the transfer voltage in forming the second potential difference at the contact portion. The control unit 200 thus performs control so that a third transfer voltage applied based on the third information is higher than the second transfer voltage. Here, the control unit 200 may perform control so that a third brush voltage in forming the third potential difference is higher than the second brush voltage in forming the second potential difference.

In the present exemplary embodiment, the toner degradation is associated with the use amount of the developing roller 31. However, this is not restrictive. For example, the remaining level of the toner in the developer accommodation chamber 33 may be used. The reason is that as the amount of toner in the developer accommodation chamber 33 is smaller, the frequency of agitation of a single toner particle and the sliding friction against the developing blade 34 becomes relatively higher, which causes the degradation to progress. Examples of a unit for detecting the remaining toner level are broadly classified into the following two types. One is a hardware prediction unit that predicts the remaining level by detecting a change in the behavior of the toner in the developer accommodation chamber 33 using a change in the degree of light transmission. The other is a software prediction unit that predicts the remaining toner level based on the consumption predicted by integrating the number of pixel signals of image information.

In such a manner, the toner degradation can be associated with either the cumulative number of rotations of the developing roller 31 or the remaining toner level. It will be understood that both can be used in combination for improved accuracy.

The foregoing configuration of the second exemplary embodiment can prevent an image defect resulting from toner accumulated on the brush 10 near the end of its life.

Figure 13:
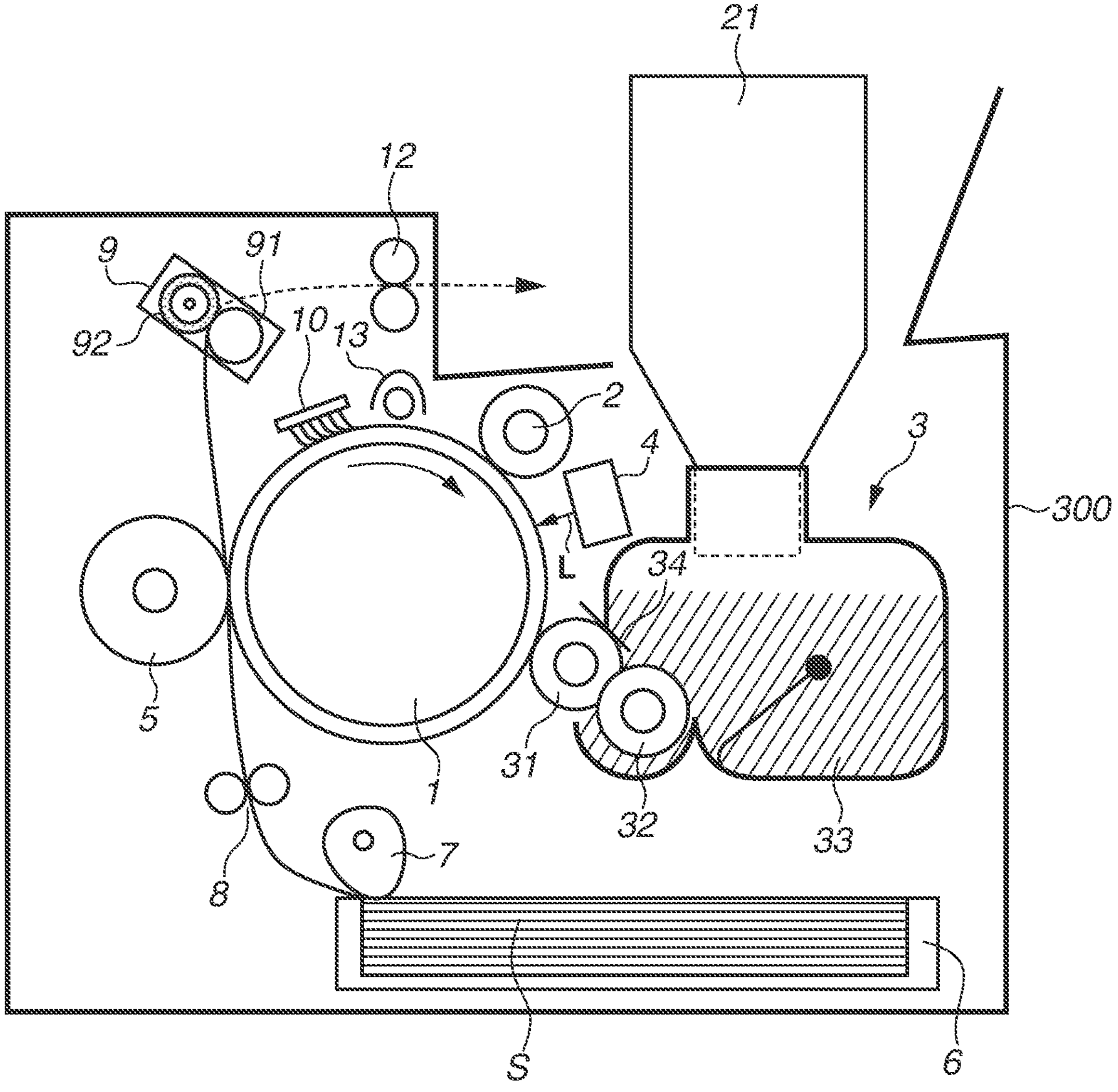
FIG. 13 is an explanatory diagram illustrating an image forming apparatus according to a third exemplary embodiment.

Next, a third exemplary embodiment of the present disclosure will be described. FIG. 13 illustrates an image forming apparatus 300 according to the third exemplary embodiment, which has a basic configuration and operation similar to those of the image forming apparatus 100 according to the first exemplary embodiment. Components of the image forming apparatus 300 of the third exemplary embodiment having functions or configuration similar or corresponding to those of the image forming apparatus 100 of the first exemplary embodiment are therefore denoted by the same reference numerals as those of the image forming apparatus 100 of the first exemplary embodiment. A detailed description thereof will be omitted.

In the present exemplary embodiment, control of an image forming apparatus 300 of toner replenishment type where the developer accommodation chamber 33 is replenished with toner will be described. A system for replenishing toner from a toner container 21 outside the main body of the image forming apparatus 300 as illustrated in FIG. 13 at a time when the remaining level of the toner in the developer accommodation chamber 33 is detected to have decreased to near a predetermined amount will be described. The present exemplary embodiment is also applicable to a toner replenishment system where the developer accommodation chamber 33 is successively replenished with toner from an external toner supply container connected to the developer accommodation chamber 33 by means of screw conveyance so that the remaining toner level is maintained at a substantially constant level.

In the second exemplary embodiment, the switching control of the recording material trailing edge voltage based on a change in the polarity of the fog toner due to toner degradation has been described. In the present exemplary embodiment, control to be performed after the remaining level of the toner in the developer accommodation chamber 33 is equal to or less than a predetermined level and the developer accommodation chamber 33 is then replenished with toner again will be described.

Figure 14A:
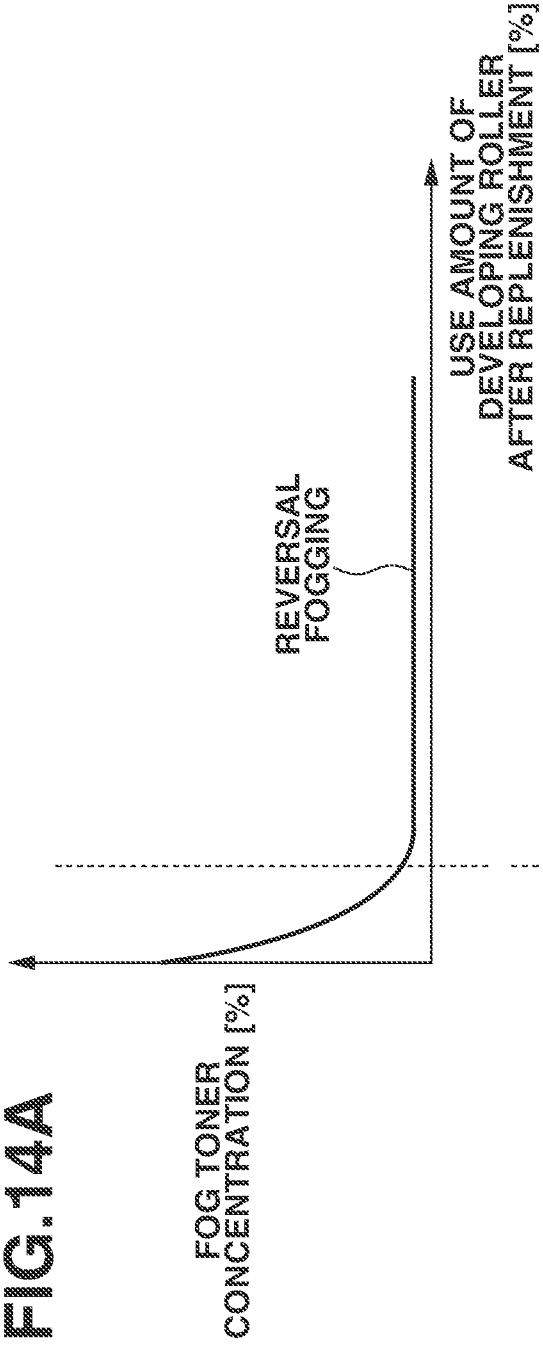
FIGS. 14A and 14B are diagrams illustrating the use amount of a developing roller, the transition of fog toner, and recording material trailing edge voltage control according to the third exemplary embodiment.
Figure 14B:
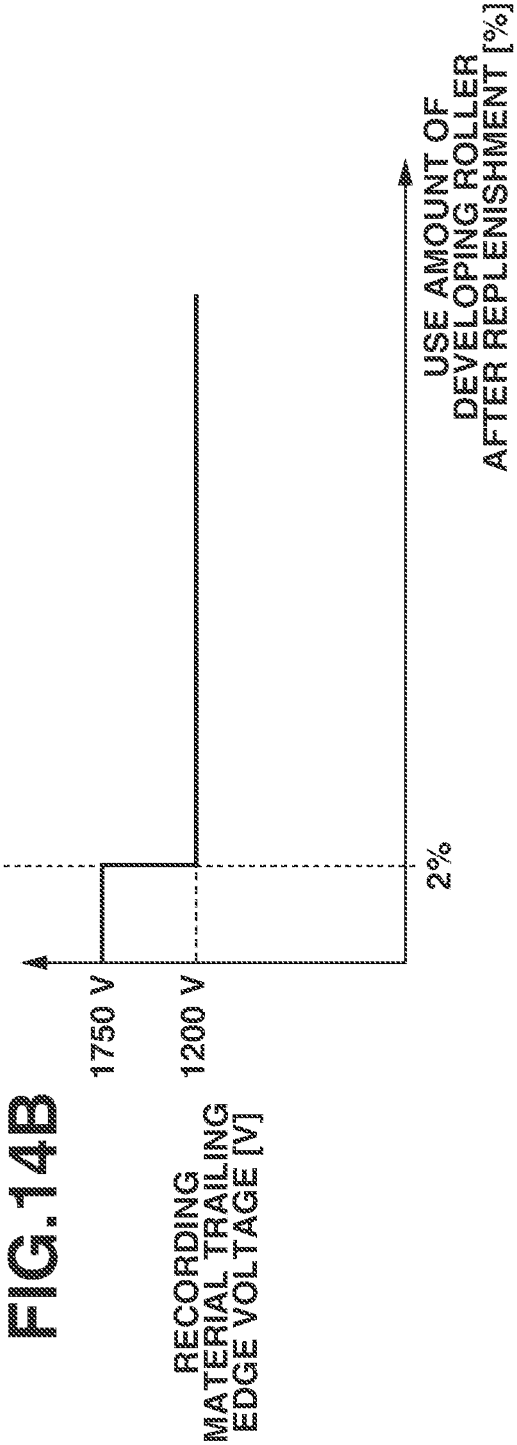

If the developer accommodation chamber 33 is replenished with a large amount of toner after a decrease in the remaining toner level, the ratio of new toner increases. In such a case, fog toner is expected to behave similarly to the case where the toner is in the new condition described in the first exemplary embodiment. Suppose, for example, the use amount of the developing roller 31 reaches 100% in the sheet passing test according to the second exemplary embodiment and then 80 g of toner is replenished. FIG. 14A illustrates the transition of the fog toner concentration with respect to the use amount of the developing roller 31 after the toner replenishment. As illustrated in FIG. 14A, the fog toner concentration after the toner replenishment transitions similarly to the case where the toner is in the new condition according to the first exemplary embodiment. In the present exemplary embodiment, reversal fogging decreases at the use amount of the developing roller 31 of approximately 2%. The toner discharge from the brush 10 can thus be prevented by performing control to switch the recording material trailing edge voltage as illustrated in FIG. 14B.

As described above, in the toner replenishment system according to the present exemplary embodiment, when toner is detected to be replenished, the use amount of the developing roller 31 starts to be calculated from 0% after the replenishment and referred, aside from the use amount of the developing roller 31 calculated before the replenishment. The recording material trailing edge voltage can thus be appropriately switched based on a change in the polarity of the fog toner corresponding to the use amount of the developing roller 31 after the toner replenishment, and an image defect due to toner discharge from the brush 10 can be prevented.

As has been described above, according to an exemplary embodiment of the present disclosure, an image defect resulting from toner accumulated on a brush can be prevented.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™(BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-045082, filed Mar. 22, 2022, which is hereby incorporated by reference herein in its entirety.

What is claimed is:

1. An image forming apparatus comprising:

an image bearing member that is rotatable;

a charging member configured to charge a surface of the image bearing member at a charging portion opposed to the surface of the image bearing member;

a developing member configured to supply toner charged to normal polarity to the surface of the image bearing member;

a transfer member configured to come into contact with the image bearing member to form a transfer portion, and sandwich and convey a recording material and transfer the toner supplied to the image bearing member to the recording material at the transfer portion;

a transfer voltage application unit configured to apply a transfer voltage having polarity opposite to the normal polarity to the transfer member;

a brush configured to come into contact with the surface of the image bearing member to form a brush portion downstream of the transfer portion and upstream of the charging portion in a direction of rotation of the image bearing member;

a brush voltage application unit configured to apply a brush voltage of the normal polarity to the brush;

a storage unit configured to store information about use of the toner; and a control unit configured to control the transfer voltage application unit and the brush voltage application unit, wherein, after the toner supplied to the surface of the image bearing member is transferred to the recording material at the transfer portion, the developing member is configured to collect toner remaining on the surface of the image bearing member, and wherein, in a case where, in a state where a leading edge of the recording material in a conveyance direction of the recording material or a trailing edge of the recording material in the conveyance direction is sandwiched at the transfer portion, an area of the image bearing member in the conveyance direction where the recording material is sandwiched in a direction perpendicular to the conveyance direction at the transfer portion is a first area, and an area of the image bearing member in the conveyance direction where the transfer member is in contact with the image bearing member and the recording material is not sandwiched in the direction perpendicular to the conveyance direction at the transfer portion is a second area, the control unit is configured to perform control so that a first potential difference, which is based on first information stored in the storage unit, formed between a surface potential formed on the second area and the brush voltage, in a case where the second area reaches the brush portion, is different from a second potential difference, which is based on second information stored in the storage unit and different from the first information, formed between the surface potential formed on the second area and the brush voltage, in the case where the second area reaches the brush portion.

2. The image forming apparatus according to claim 1, wherein the second information is about the toner that is used longer than the toner in the first information, and wherein, in forming the first potential difference, the control unit is configured to perform control so that the surface potential formed on the second area has an absolute value smaller than an absolute value of the brush voltage.

3. The image forming apparatus according to claim 2, wherein the second area includes a gap wall portion formed at the leading edge or the trailing edge and a contact portion where the image bearing member and the transfer member are in contact with each other, and wherein the control unit is configured to perform control so that the transfer voltage in forming the second potential difference at the contact portion is lower than the transfer voltage in forming the first potential difference at the contact portion.

4. The image forming apparatus according to claim 2, wherein the control unit is configured to perform control so that the brush voltage in forming the second potential difference is lower than the brush voltage in forming the first potential difference.

5. The image forming apparatus according to claim 2, wherein, in controlling a third potential difference formed between the surface potential formed on the second area and the brush voltage, which is determined based on third information about the toner that is used longer than the toner in the second information, in the case where the second area reaches the brush portion, the control unit is configured to perform control so that the surface potential formed on the second area in forming the third potential difference has an absolute value smaller than an absolute value of the brush voltage.

6. The image forming apparatus according to claim 5, wherein the second area includes a gap wall portion formed at the leading edge or the trailing edge and a contact portion where the image bearing member and the transfer member are in contact with each other, and wherein the control unit is configured to perform control so that the transfer voltage in forming the third potential difference at the contact portion has an absolute value greater than an absolute value of the transfer voltage in forming the second potential difference at the contact portion.

7. The image forming apparatus according to claim 5, wherein the control unit is configured to perform control so that the brush voltage in forming the third potential difference has an absolute value greater than an absolute value of the brush voltage in forming the second potential difference.

8. The image forming apparatus according to claim 1, wherein a cumulative number of sheets that pass through the image forming apparatus is used as the information about the use of the toner.

9. The image forming apparatus according to claim 1, wherein a cumulative number of rotations of the developing member of the image forming apparatus is used as the information about the use of the toner.

10. The image forming apparatus according to claim 1, further comprising a developing device including the developing member and a developer accommodation unit configured to accommodate the toner, wherein remaining level information about the toner accommodated in the developer accommodation unit is used as the information about the use of the toner.

11. An image forming apparatus comprising:

an image bearing member that is rotatable;

a charging member configured to charge a surface of the image bearing member at a charging portion opposed to the surface of the image bearing member;

a developing member configured to supply toner charged to normal polarity to the surface of the image bearing member;

a transfer member configured to come into contact with the image bearing member to form a transfer portion, and sandwich and convey a recording material and transfer the toner supplied to the image bearing member to the recording material at the transfer portion;

a transfer voltage application unit configured to apply a transfer voltage having polarity opposite to the normal polarity to the transfer member;

a brush configured to come into contact with the surface of the image bearing member to form a brush portion downstream of the transfer portion and upstream of the charging portion in a direction of rotation of the image bearing member;

a storage unit configured to store information about use of the toner; and a control unit configured to control the transfer voltage application unit, wherein, after the toner supplied to the surface of the image bearing member is transferred to the recording material at the transfer portion, the developing member is configured to collect toner remaining on the surface of the image bearing member, and wherein, in a case where, in a state where a leading edge of the recording material in a conveyance direction of the recording material or a trailing edge of the recording material in the conveyance direction is sandwiched at the transfer portion, an area of the image bearing member in the conveyance direction where the recording material is sandwiched in a direction perpendicular to the conveyance direction at the transfer portion is a first area, and an area of the image bearing member in the conveyance direction where the transfer member is in contact with the image bearing member and the recording material is not sandwiched in the direction perpendicular to the conveyance direction at the transfer portion is a second area, the control unit is configured to, in a case where the second area forms the transfer portion, perform control so that a first transfer voltage applied based on first information stored in the storage unit is different from a second transfer voltage applied based on second information stored in the storage unit.

12. The image forming apparatus according to claim 11, wherein the second information is about the toner that is used longer than the toner in the first information, and wherein the control unit is configured to perform control so that the first transfer voltage has an absolute value greater than an absolute value of the second transfer voltage.

13. The image forming apparatus according to claim 11, wherein, in controlling a third potential difference based on third information about the toner that is used longer than the toner in the second information, the control unit is configured to perform control so that a third transfer voltage applied based on the third information stored in the storage unit has an absolute value greater than an absolute value of the second transfer voltage.

14. An image forming apparatus comprising:

an image bearing member that is rotatable;

a charging member configured to charge a surface of the image bearing member at a charging portion opposed to the surface of the image bearing member;

a developing member configured to supply toner charged to normal polarity to the surface of the image bearing member;

a transfer member configured to come into contact with the image bearing member to form a transfer portion, and sandwich and convey a recording material and transfer the toner supplied to the image bearing member to the recording material at the transfer portion;

a brush configured to come into contact with the surface of the image bearing member to form a brush portion downstream of the transfer portion and upstream of the charging portion in a direction of rotation of the image bearing member;

a brush voltage application unit configured to apply a brush voltage of the normal polarity to the brush;

a storage unit configured to store information about use of the toner; and a control unit configured to control the brush voltage application unit, wherein, after the toner supplied to the surface of the image bearing member is transferred to the recording material at the transfer portion, the developing member is configured to collect toner remaining on the surface of the image bearing member, and wherein, in a case where, in a state where a leading edge of the recording material in a conveyance direction of the recording material or a trailing edge of the recording material in the conveyance direction is sandwiched at the transfer portion, an area of the image bearing member in the conveyance direction where the recording material is sandwiched in a direction perpendicular to the conveyance direction at the transfer portion is a first area, and an area of the image bearing member in the conveyance direction where the transfer member is in contact with the image bearing member and the recording material is not sandwiched in the direction perpendicular to the conveyance direction at the transfer portion is a second area, the control unit is configured to, in a case where the second area forms the transfer portion, perform control so that a first brush voltage applied based on first information stored in the storage unit is different from a second brush voltage applied based on second information stored in the storage unit.

15. The image forming apparatus according to claim 14, wherein the second information is about the toner that is used longer than the toner in the first information, and wherein the control unit is configured to perform control so that the first brush voltage has an absolute value greater than an absolute value of the second brush voltage.

16. The image forming apparatus according to claim 14, wherein the control unit is configured to, in controlling a third potential difference based on third information about the toner that is used longer than the toner in the second information, perform control so that a third brush voltage applied based on the third information stored in the storage unit has an absolute value greater than an absolute value of the second brush voltage.

* * * * *